US007636547B2

(12) United States Patent
Minotani et al.

(10) Patent No.: US 7,636,547 B2
(45) Date of Patent: Dec. 22, 2009

(54) REACTANCE ADJUSTER, TRANSCEIVER AND TRANSMITTER USING THE REACTANCE ADJUSTER, SIGNAL PROCESSING CIRCUIT SUITABLE FOR USE IN THE REACTANCE ADJUSTER, THE TRANSCEIVER, AND THE TRANSMITTER, REACTANCE ADJUSTING METHOD, TRANSMITTING METHOD, AND RECEIVING METHOD

(75) Inventors: Tadashi Minotani, Kanagawa (JP); Nobutarou Shibata, Kanagawa (JP); Mitsuru Shinagawa, Kanagawa (JP)

(73) Assignee: Nippon Telegraph and Telephone Corporation (JP)

( * ) Notice: Subject to any disclaimer, the term of this patent is extended or adjusted under 35 U.S.C. 154(b) by 634 days.

(21) Appl. No.: 10/542,327

(22) PCT Filed: Dec. 1, 2004

(86) PCT No.: PCT/JP2004/017883

§ 371 (c)(1),
(2), (4) Date: Jul. 13, 2005

(87) PCT Pub. No.: WO2005/060131

PCT Pub. Date: Jun. 30, 2005

(65) Prior Publication Data

US 2006/0052074 A1 Mar. 9, 2006

(30) Foreign Application Priority Data

Dec. 5, 2003 (JP) ............................. 2003-407852
Apr. 9, 2004 (JP) ............................. 2004-115132

(51) Int. Cl.
  *H04B 5/00* (2006.01)

(52) U.S. Cl. ................ 455/41.1; 455/575.6; 455/556.1; 455/557; 455/73; 375/219; 375/220

(58) Field of Classification Search .............. 455/575.6, 455/556.1, 557, 73, 41.1; 375/219, 220
See application file for complete search history.

(56) References Cited

U.S. PATENT DOCUMENTS 3,305,733 A 2/1967 Jahn (Continued)

FOREIGN PATENT DOCUMENTS

EP 0 621 550 A2 10/1994

(Continued)

OTHER PUBLICATIONS

T.G. Zimmerman, "Personal Area Networks: Near-field intrabody communication", IBM Systems Journal, IBM Corp. Armonk, New York, US vol. 35, Nos. 3 &4, 1996, pp. 609-617, XP000635090.

(Continued)

*Primary Examiner*—Lana N Le
*Assistant Examiner*—Ping Y Hsieh
(74) *Attorney, Agent, or Firm*—Kilpatrick Stockton LLP

(57) ABSTRACT

A reactance adjuster includes an electrode (123) inducing an electric-field in an electric-field transmittable medium (121), an adjusting signal generation section (13) outputting alternatingly a high level or a low level signal to a resonance section (7), an electric-field detection section (15) generating an electric signal based on the electric-field in the medium (121), a first electric-charge storing means (C1) storing electric-charge according to the electric signal when the section (13) outputs a high level signal, a second electric-charge storing means (C2) storing electric-charge according to the electric signal when the section (13) outputs a low level signal, a voltage comparator (10) outputting a predetermined signal based on a voltage difference between the storing means, a control section (19) outputting a constant voltage when the first and the second storing means (C1, C2) are storing electric-charge and a voltage based on a predetermined signal when the storing ends.

21 Claims, 27 Drawing Sheets

U.S. PATENT DOCUMENTS

| | | | |
|---|---|---|---|
| 3,667,055 A | | 5/1972 | Uchida |
| 5,748,023 A | | 5/1998 | Hassner et al. |
| 5,914,701 A | | 6/1999 | Gersheneld et al. |
| 6,137,375 A | * | 10/2000 | Li .............................. 331/175 |
| 2002/0033729 A1 | * | 3/2002 | Lee et al. .................... 327/337 |
| 2004/0092296 A1 | | 5/2004 | Minotani et al. |

FOREIGN PATENT DOCUMENTS

| | | |
|---|---|---|
| EP | 1298822 A | 4/2003 |
| JP | 2001-352298 | 12/2001 |
| JP | 2003-188835 | 7/2003 |
| JP | 2004-153708 | 5/2004 |

OTHER PUBLICATIONS

Babk Nivi, "Passive Wearable Electrostatic Tags", Thesis, XX, XX, Massachusetts Institute of Technology, Sep. 1997, XP002358813.

Behzad Razavi, "A Design and Application of An Analog CMOS Integration Circuit," Publisher: Maruzen Co., Ltd., Mar. 2003, pp. 686-688.

* cited by examiner

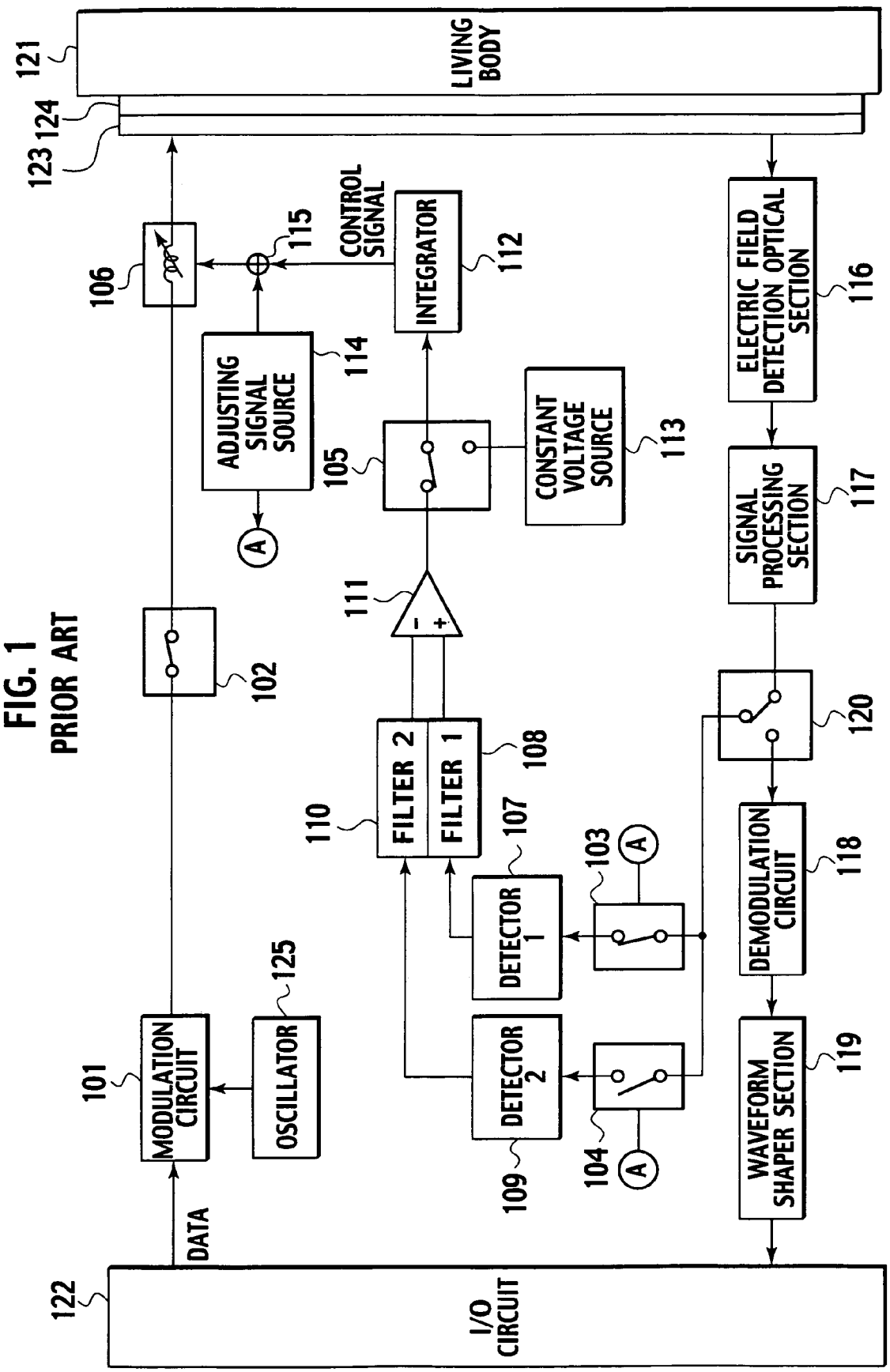

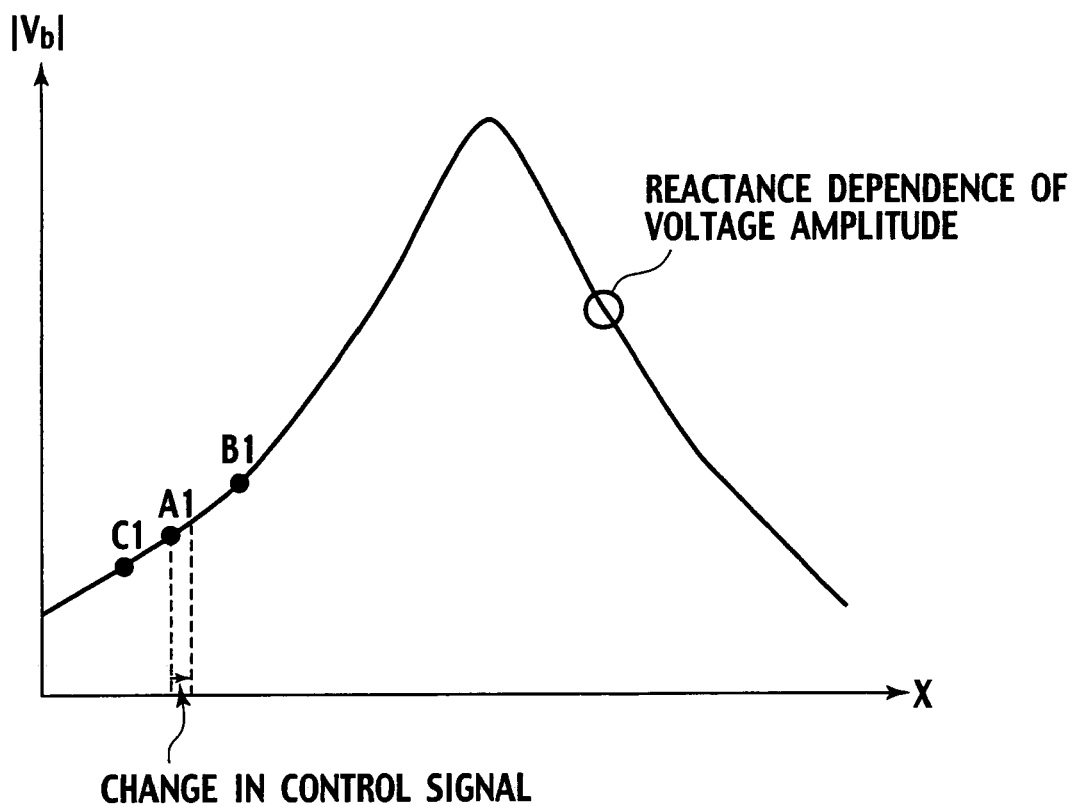

REACTANCE ADJUSTER, TRANSCEIVER AND TRANSMITTER USING THE REACTANCE ADJUSTER, SIGNAL PROCESSING CIRCUIT SUITABLE FOR USE IN THE REACTANCE ADJUSTER, THE TRANSCEIVER, AND THE TRANSMITTER, REACTANCE ADJUSTING METHOD, TRANSMITTING METHOD, AND RECEIVING METHOD

TECHNICAL FIELD

The present invention relates to a reactance adjuster that adjusts reactance caused by an electric field transmittable medium and a communication apparatus for transmitting and/or receiving a signal including data to be transmitted or received via the electric field transmittable medium, a transmitter and a transceiver using the reactance adjuster, and a signal processing circuit preferable to these. Moreover, the present invention relates to a reactance adjusting method, a transmitting method, and a receiving method.

BACKGROUND ART

Due to a miniaturization and technological advancement of a mobile device, a wearable computer mountable to a living body has attracted a lot of attention. In the past, as data communications between such wearable computers, there is proposed a method in which a transceiver is connected to a computer and an electric field induced in the living body as an electric field transmittable medium by the transceiver is transmitted therein to transmit and receive data, for example, in Japanese Patent Application Laid-open Publication 2001-352298.

In an intra-body communication in which the electric field based on a signal including data to be transmitted and received is induced in the living body and communications are carried out by detecting the induced electric field, when a transceiver that is not coupled electro-statically with the earth ground is used, a favorable communication condition is realized by providing a variable reactance section between a modulation circuit and a transmitting-and-receiving electrode as shown in FIG. 1, by controlling the reactance value, and thus by increasing the electric field intensity induced in the living body.

FIG. 1 illustrates an example of a configuration of a transceiver used in the intra-body communication. Referring to FIG. 1, the transceiver is composed of an oscillator 125 outputting an alternating signal as a carrier, a modulation circuit 101 modulating the carrier using data to be transmitted, a switch 102 turning off at the time of adjusting reactance and transmitting or turning on at the time of receiving, a variable reactance section 106 causing resonance with parasitic capacitances between a living body 121 and the earth ground and also between a ground of the transceiver circuit and the earth ground, a switch 103 turning on when detecting an electric field amplitude at the time of a reactance value being large during reactance adjustment or otherwise turning off, a switch 104 turning on when detecting an electric field amplitude at the time of a reactance value being small during reactance adjustment or otherwise turning off, a filter 108 and a detector 107 detecting an electric field amplitude at the time of a reactance value being large, a filter 110 and a detector 109 detecting an electric field amplitude at the time of a reactance value being small, a differential amplifier 111 obtaining a difference between the amplitudes at the time of the reactance value being large and small, an integrator 112 integrating an output signal of the differential amplifier 111 to output a control signal for controlling reactance, a switch 105 allowing the integrator 112 to input the signal from the differential amplifier 111 during reactance adjustment and to input an electric signal from a constant voltage source 113 during transmission, the constant voltage source 113 outputting the electric signal having a voltage value of zero to the integrator 112, an adjusting signal source 114 outputting an adjusting signal for use in reactance adjustment, an adder 115 adding the adjusting signal to the control signal and outputting to the variable reactance section 106, an electric field detection optical section 116 converting an electric field induced in the living body into an electric signal, a signal processing section 117 amplifying an output signal from the electric field detection optical section 116 and performing noise elimination or the like by a filter, a demodulation circuit 118 demodulating a received signal, a waveform shaper 119 shaping a waveform, switch 120 allowing the switches 103 and 104 to input an output signal from the signal processing section 117 to the switches 103 and 104 during reactance adjustment or transmission and the demodulation circuit 118 to input the output signal during receiving, an input/output (I/O) circuit 122, a transmitting-and-receiving electrode 123, and an insulator 124.

In the transceiver having the above configuration shown in FIG. 1, a reactance value of the variable reactance is controlled so as to maximize an electric field to be induced in the living body 121. In this control, a reactance value is changed timewise from the reactance value set by a control signal. The control signal is changed to be larger when the electric field amplitude at the time of a reactance value being large is larger and to be smaller when the electric field amplitude is smaller. This operation continues to control until the amplitude becomes equal.

In FIG. 1, the electric field amplitude at the time of a reactance value being large is detected by a circuit on the switch 103 side and the electric field amplitude at the time of a reactance value being small is detected by a circuit on the switch 104 side. These values are compared by the differential amplifier 111. When the electric field amplitude at the time of a reactance value being large is larger, a positive signal is inputted to the integrator 112, thereby increasing the control signal and reducing the reactance value. When smaller, a negative signal is inputted to the integrator 112, thereby reducing the reactance value. In this method, when a magnitude relation between the adjusting signal and reactance value is correct, the reactance is automatically controlled to be the maximum.

In order to explain in detail, a waveform outputted from each component illustrated in FIG. 2A and a change of the reactance value illustrated in FIG. 2B are referred to. B1 and C1 in FIG. 2B correspond to a reactance value at the time of the adjusting signal B1 and C1, respectively. A1 is a reactance value at the beginning. In the configuration shown in FIG. 1, while the electric field amplitude is being detected, a signal is inputted to the integrator 112. When a change of the control signal is smaller than the amplitude of the adjusting signal, the reactance value at the time of C1 moves close to the reactance value at the time of A1 but is still lower than the reactance value at the time of B1. Because a relation between the adjusting signal and the reactance value is not changed, a reactance control is performed without any problem.

A waveform outputted from each component and a change in a reactance value when a change of the control signal is larger than the adjusting signal are illustrated in FIGS. 3A and 3B, respectively. B2 and C2 in FIG. 3B are a reactance value when the adjusting signals in FIG. 3A are at B2 and C2, respectively.

In addition, as the integrator 112, a signal processing circuit which has a simple circuit configuration and is suitable for circuit integration, specifically, a charge pump is often used in the past. Such a charge pump is explained in detail for example in Behzad Razavi (author), Tadahiro Kuroda (translation supervisor), "A design and application of an analog CMOS integration circuit", Maruzen CO., LMD., March 2003, pp. 686-688.

FIG. 4 is a circuit block diagram illustrating an example of a signal processing circuit using a charge pump. The signal processing circuit 4 illustrated in FIG. 4 is comprised of two switches SW1, SW2 and a capacitor 241.

In the signal processing circuit 4, when an UP signal is inputted from outside and the switch SW1 is closed to be "on", an electric charge flows from a voltage source Vdd having a higher voltage than a ground to the capacitor 241, thereby increasing an output voltage. Here, an "on" resistance of the switch SW1 is not zero and a timewise change of an electric charge, i.e., a current is finite. Therefore, the output voltage is not raised instantaneously to the voltage of the voltage source Vdd.

On the other hand, when a DOWN signal is inputted from outside, the switch SW2 turns on and the electric charge stored in the capacitor 241 flows to the ground, thereby reducing the output voltage.

In addition, when both switches are off (open), an amount of the electric charge stored in the capacitor 241 does not change, thereby maintaining the output voltage.

In such a signal processing circuit 4, the output voltage changes in accordance with an integration over a time period of the UP signal and the DOWN signal being inputted.

In the transceiver according to the above-stated conventional art, when a change of the control signal is larger than the adjusting signal, the reactance value at the time of the adjusting signal of C2 is larger than the reactance at the time of the adjusting signal of B2. Therefore, a magnitude relation between the adjusting signal and the reactance value is reversed, thereby jeopardizing a control to obtain the maximum value.

By the way, in order to shorten a time that is needed to maximize the amplitude of the electric field induced in the living body 121 from the beginning of reactance control, the control signal has to change largely. However, in the configuration shown in FIG. 1, the control signal cannot be changed largely, thereby prolonging a time that takes until the maximum value is obtained.

In addition, since data to be transmitted is transmitted after the reactance control is finished, if it takes a long time until the maximum value is obtained, a time to be set aside for transmitting data becomes short, thereby reducing an effective transmitting speed of data.

The above-stated signal processing circuit 4 as an integrator is often used in a Phase Locked Loop (PLL) circuit, which is an electric circuit that enables a frequency of the output signal to coincide with a reference frequency of the input signal or the like. In the PLL circuit, no large current flows from the voltage source Vdd to the ground, since the UP signal and the DOWN signal are not inputted into the circuit at the same time.

On the other hand, when the signal processing circuit 4 is applied to a circuit in which the UP signal and the DOWN signal are both inputted at the same time, the two switches SW1 and SW2 are both on. As a result, a large current can flow from the voltage source Vdd to the ground, thereby leading to a disadvantage of increased power consumption.

DISCLOSURE OF INVENTION

The present invention has been made in view of the above circumstances. The objective thereof is to provide a transceiver that is configured into a control circuit that makes it possible to shorten a time that takes to obtain the maximum value while maintaining stability, and enables a stable data communication at high speed.

Another objective of the present invention is to provide a signal processing circuit (an integrator) that is able to avoid an increase in power consumption and is suitable for circuit integration, thereby reducing power consumption of communications apparatuses or the like.

In order to achieve the above objective, a first aspect of the present invention provides a transceiver in which an electric field based on data to be transmitted is induced in an electric field transmittable medium so as to transmit data using the induced electric field and to receive data by receiving an electric field that is induced in the electric field transmittable medium based on data to be received. The transceiver is comprised of a transmitting means that outputs an alternating signal having a predetermined frequency, modulates the signal with data to be transmitted and transmits the modulated signal according to the data; a transmitting-and-receiving electrode that induces an electric field based on the data to be transmitted and receives an electric field based on the data to be received; a resonance means that is connected in series with the transmitting means and the transmitting-and-receiving electrode to induce a series resonance by adjusting reactance against parasitic capacitance produced between a ground of the transmitting means, the electric field transmittable medium, and the earth ground; an electric field detection means that detects the electric field based on the data to be received and converts the electric field to an electric signal; an adjusting signal generation means outputting an adjusting signal for use in adjusting a reactance value of the resonance means; a amplitude detection means that includes a differential amplifying means having a first electric charge storing means storing the electric signal detected at the time of the reactance value being large, a second electric charge storing means storing the electric signal detected at the time of the reactance value being small in adjusting the reactance of the resonance means, a detection means detecting an electric field amplitude at the time of the reactance being large, and a filter eliminating a high-frequency component from the detected electric field and amplifies the difference between the electric field amplitudes at the time of the reactance value being large and at the time of the reactance value being small in adjusting the reactance of the resonance means in order to detect an amplitude of the electric signal outputted from the electric field detection means using the adjusting signal outputted from the adjusting signal generation means, and a constant voltage source generating a constant voltage signal; a control signal generation means generating a control signal to control a characteristics of the resonance means based on the amplitude detected by the amplitude detection means; and a demodulation means demodulating the electric signal converted by the electric field detection means.

A second aspect of the present invention provides a transceiver according to the first aspect, wherein the control signal generation means includes an integrator integrating an output signal from the differential amplifying means to produce the integrated signal and an adder adding the signal produced by the integrator and the adjusting signal outputted from the adjusting signal generation means.

A third aspect of the present invention provides a transceiver according to the second aspect, wherein the integrator includes a voltage comparator comparing the electric field amplitudes at the time of the reactance value being large and small, a first p-channel MOS-FET and a second n-channel MOS-FET that are off at the time of detecting the amplitude and on at the time of integrating, a second p-channel MOS-FET and a first n-channel MOS-FET that turn on the second p-channel MOS-FET and turn off the first n-channel MOS-FET so as to increase an output voltage when the electric field amplitude at the time of the reactance value being large is larger and turn off the second p-channel MOS-FET and turn on the first n-channel MOS-FET so as to reduce the output voltage when the electric field amplitude at the time of the reactance value being large is small, and a capacitor maintaining the control signal.

A fourth aspect of the present invention provides a transceiver according to the third aspect, wherein the integrator in the third aspect includes a first constant voltage source outputting a predetermined first threshold, a second constant voltage source outputting a predetermined second threshold, a first voltage comparator outputting a result obtained by comparing the first threshold and an output of the differential amplifying means, and a second voltage comparator outputting a result obtained by comparing the second threshold and an output of the differential amplifying means.

A fifth aspect of the present invention provides a transceiver according to the fourth aspect, wherein the integrator in the fourth aspect includes a first variable resistor controlling a change rate of a voltage of the control signal when the voltage is increased, a second variable resistor controlling a change rate of a voltage of the control signal when the voltage is decreased, a first differential amplifier that compares the first threshold and an output of the differential amplifying means and thus outputs a signal controlling the first variable resistor and a second differential amplifier that compares the second threshold and an output of the differential amplifying means and thus outputs a signal controlling the second variable resistor.

A sixth aspect of the present invention provides a transceiver according to the fourth aspect, wherein there is provided a sampling means sampling the electric signal outputted from the electric field detection means, instead of the detection means and the filter.

A seventh aspect of the present invention provides a transceiver according to the fourth aspect, wherein there is provided a peak-hold means maintaining a peak of the amplitude of the electric signal outputted from the electric field detection means, instead of the detection means and the filter.

In an eighth aspect of the present invention, the peak-hold means according to the seventh aspect has an adding means that detects the peak for a predetermined number of times to add and maintains the added value.

In order to achieve the above objective, a ninth aspect of the present invention provides a signal processing circuit. The signal processing circuit is comprised of an electric charge storing means storing an electric charge so as to maintain an output voltage, a first connection means being closed when an electric charge is stored in the electric charge storing means so as to increase the output voltage, a second connection means being closed when the electric charge stored in the electric charge storing means is transferred to the ground so as to decrease the output voltage, a first signal comparison means that compares a signal inputted from outside and a predetermined first threshold and outputs a control signal to close the first connection means when the inputted signal is lower, and a second signal comparing means that compares the inputted voltage and a second threshold that is predetermined to have a higher voltage value than the first threshold and outputs a control signal to close the second connection means when the inputted voltage is lower.

A tenth aspect of the present invention provides a signal processing circuit according to the ninth aspect, in which there is provided a first and a second current source that are connected in series with the first and the second connection means, respectively, to produce a current, a third signal comparison means that compares the inputted voltage and a third threshold that is predetermined to have a lower voltage than the first threshold and outputs a current control signal to the first current source to cause the first current source to flow a first constant current having a predetermined value when the inputted voltage is lower than the third threshold and outputs a current control signal to the first current source to cause the first current source to flow a second constant current having a smaller current value than the first constant current, a fourth signal comparison means that compares the inputted voltage and a fourth threshold that is predetermined to have a larger voltage than the second threshold and outputs a control signal to the second current source to cause the second current source to flow a constant current having the same current value as the first constant current when the inputted voltage is higher than the fourth threshold and outputs a current control signal to the second current source to cause the second current source to flow a constant current having the same current value as the second constant current when the inputted voltage is higher than the second threshold and lower than the fourth threshold.

An eleventh aspect of the present invention provides a signal processing circuit according to the ninth aspect, wherein a first and a second current source connected in series with the first and the second connection means, respectively, to produce a current, a first differential amplifying means that obtains a difference between the inputted voltage and the first threshold and outputs a continuously-changeable current control signal to the first current source so that the lower the inputted voltage is the larger the current flows from the first current source, and a second differential amplifying means that obtains a difference between the inputted voltage and the second threshold and outputs a continuously-changeable current control signal to the second current source so that the larger the inputted voltage is the larger the current flows from the second current source.

According to the present invention, there is provided a transceiver that is configured into a control circuit that makes it possible to shorten a time that takes to obtain the maximum value while maintaining stability, and enables a stable data communication at high speed.

In addition, according to the present invention, there is provided a signal processing circuit suitable in integration, in which a large current is prevented from flowing when an observed value and a target value are met, thereby preventing an increase in power consumption.

BRIEF DESCRIPTION OF DRAWINGS

FIG. 1 is a schematic diagram of a conventional transceiver;

FIG. 2B is an explanatory drawing of an operation of the conventional transceiver;

BEST MODE FOR CARRYING OUT THE INVENTION

Referring to accompanying drawings, a transceiver according to preferred embodiments of the present invention will be described hereinafter. The transceiver described hereinafter includes a reactance adjuster according to an embodiment of the present invention. Thus, the reactance adjuster also will be described below.

A First Embodiment

Figure 2A:
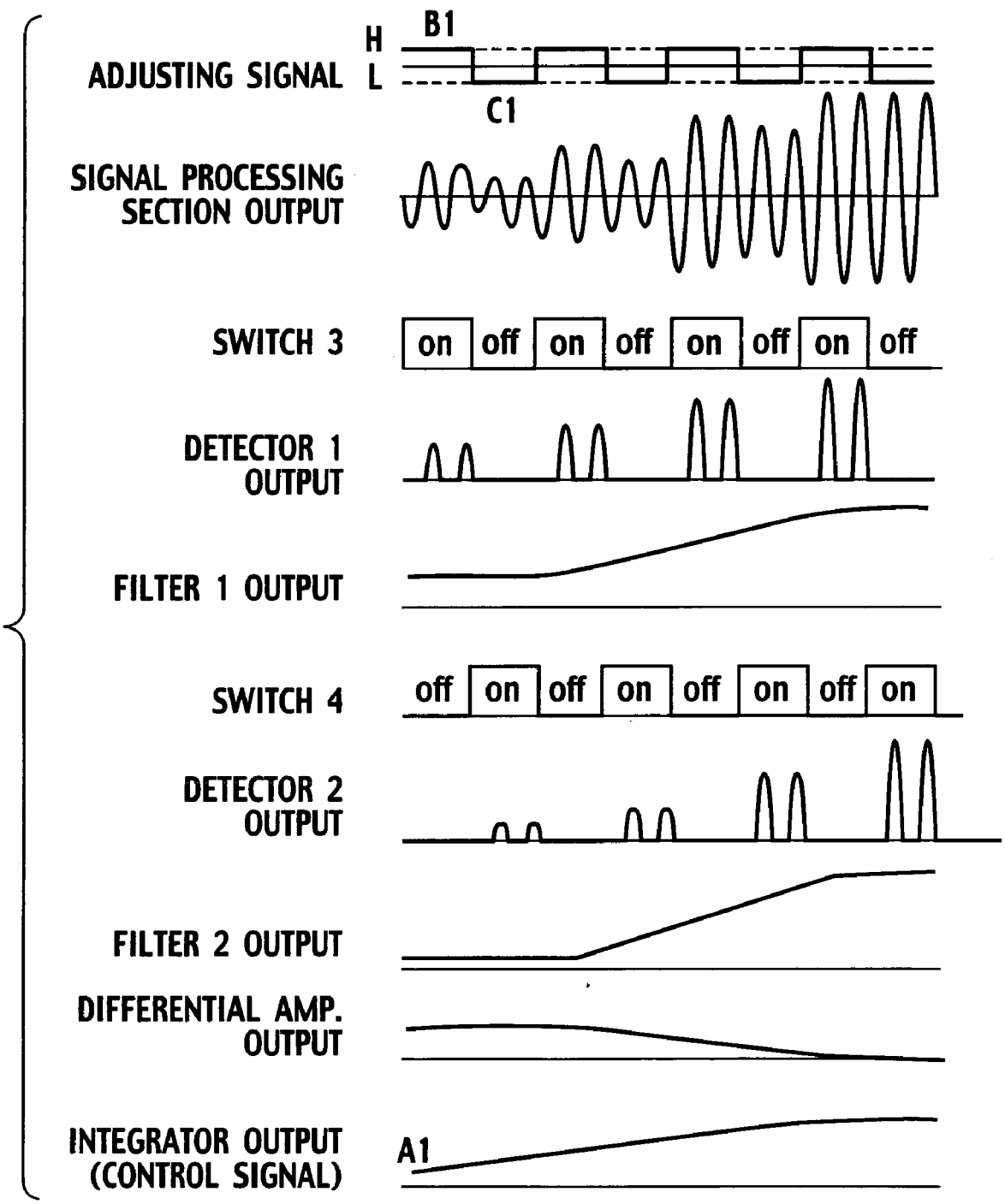
FIG. 2A is an explanatory drawing of an operation of the conventional transceiver.
Figure 3A:
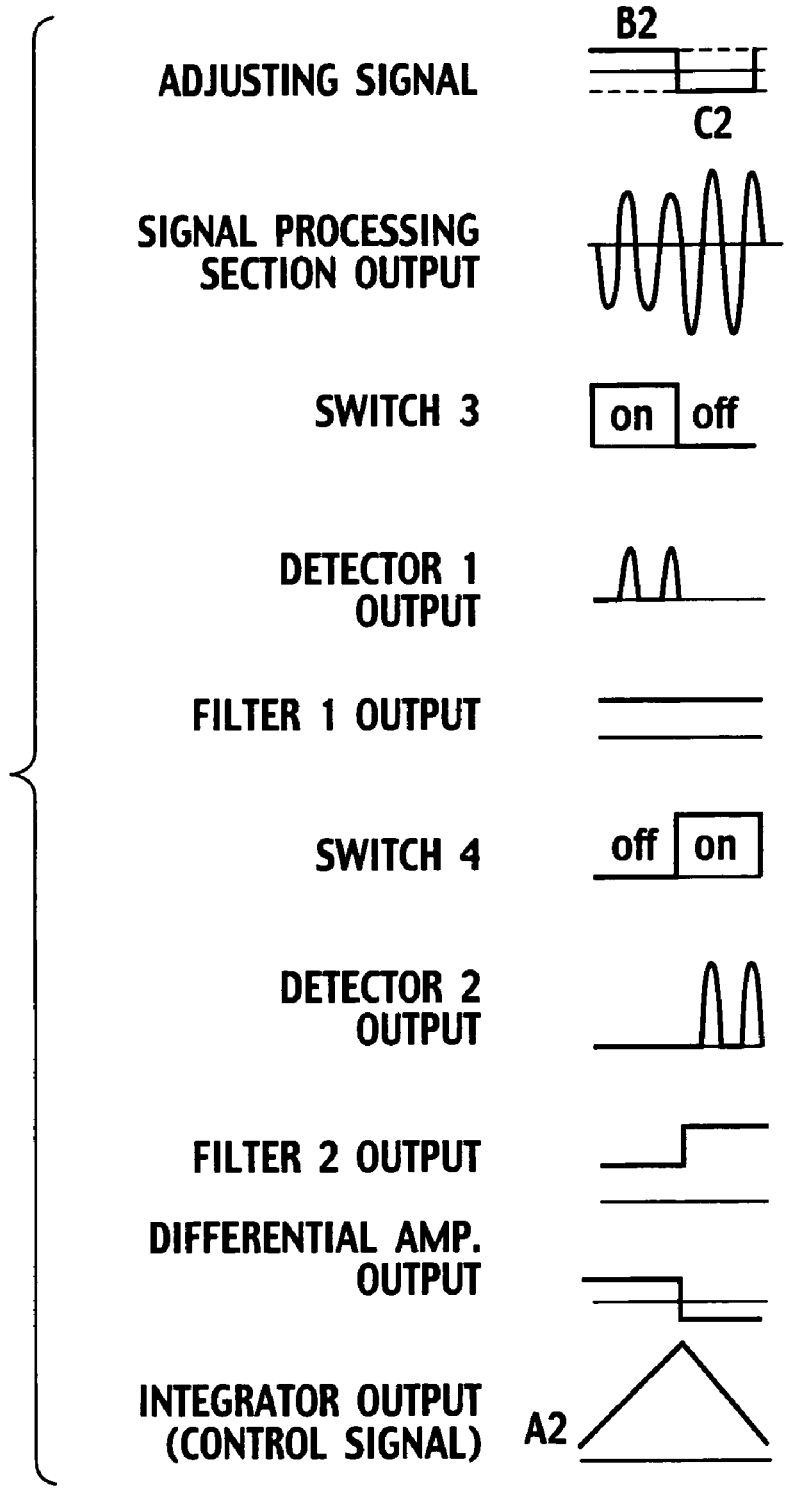
FIG. 3A is an explanatory drawing of an operation of the conventional transceiver.
Figure 3B:
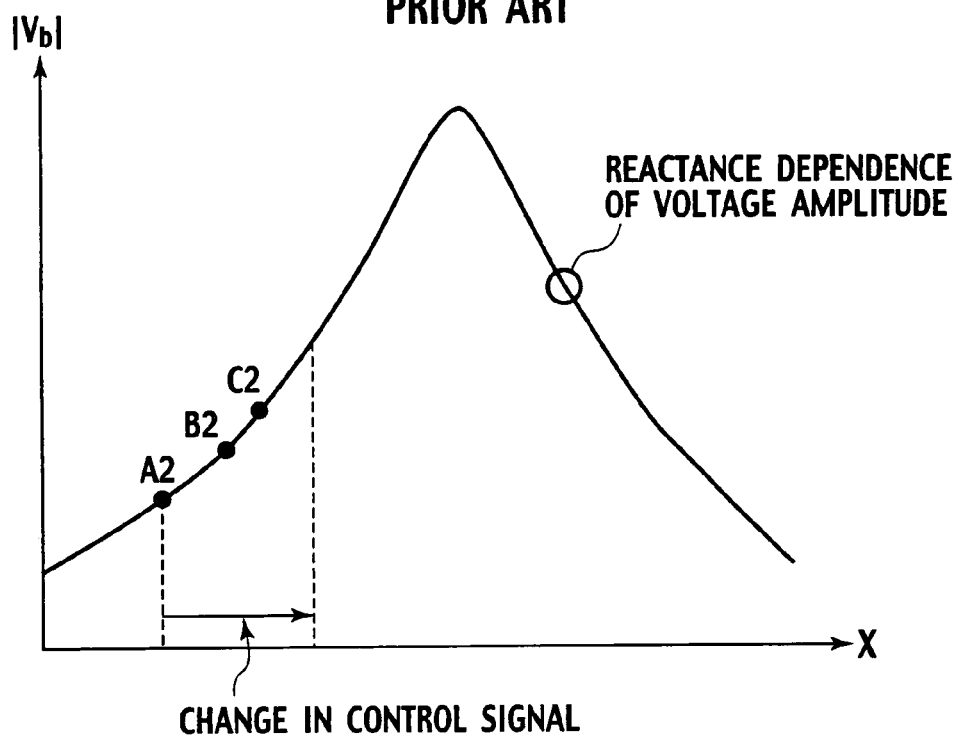
FIG. 3B is an explanatory drawing of an operation of the conventional transceiver.
Figure 4:
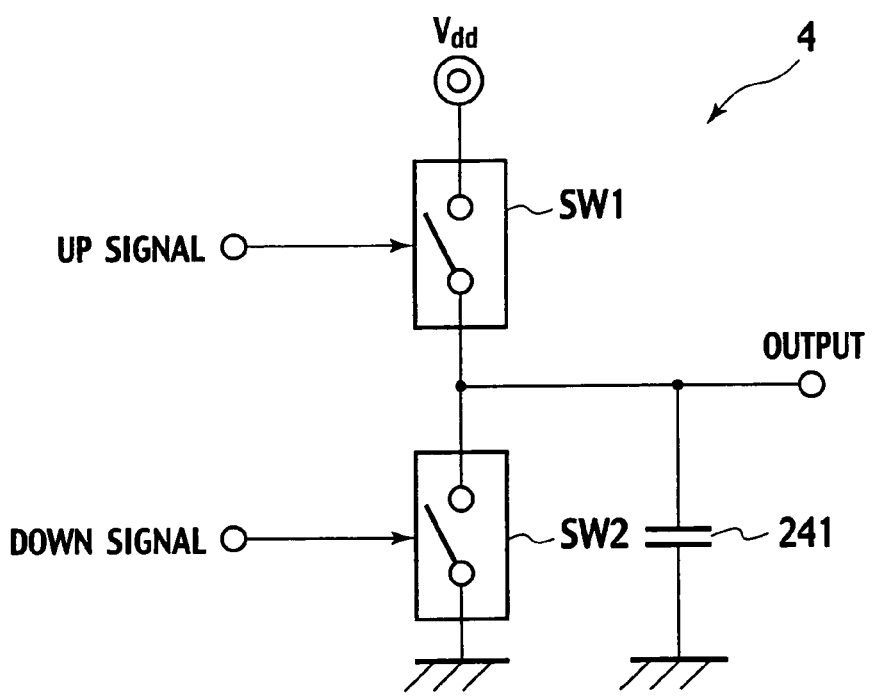
FIG. 4 is a circuit block diagram illustrating a configuration of a conventional signal processing circuit.
Figure 5:
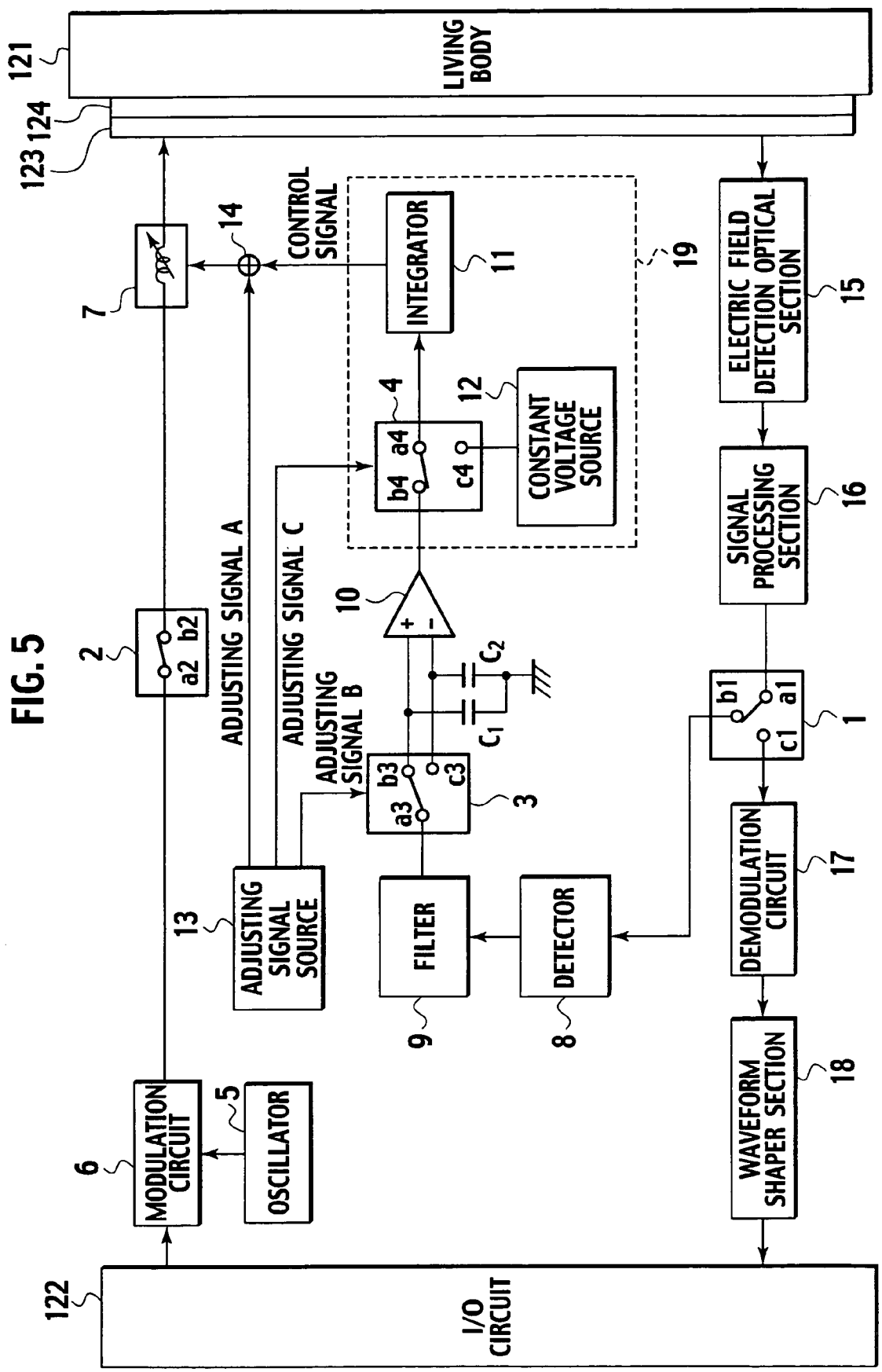
FIG. 5 is an overall block diagram of a transceiver according to a first embodiment of the present invention.

FIG. 5 is a block diagram of a transceiver according to a first embodiment of the present invention. The transceiver according to the first embodiment illustrated in FIG. 5 is comprised of an oscillator 5 outputting an alternating electric signal to be a carrier having a frequency of about 1 megahertz (MHz) to several tens MHz, a modulation circuit 6 modulating the carrier wave using data to be transmitted obtained from a computer (not shown) via an Input/Output circuit described hereinafter, a switch 2 turning on at the time of adjusting reactance or transmitting and turning off at the time of receiving, a variable reactance section 7 inducing resonance with parasitic capacitance between a living body and an earth or between a ground contact of the transceiver and the earth, a switch 3 connecting a contact a3 with a contact b3 so as to charge a capacitor C1 with the detected signal when a large reactance is detected and connecting the contact a3 with the contact c3 to charge a capacitor C2 with the detected signal when a lower reactance value is detected during reactance adjustment, a detector 8 and a filter 9 detecting an electric amplitude when the reactance value is large, a differential amplifier 10 obtaining a difference of the electric amplitudes between when the reactance value is large and when the reactance value is small, an integrator 11 integrating an output signal and outputting a control signal for controlling the reactance, a switch 4 connecting a contact a4 with a contact c4 to input a signal from a constant voltage source 12 so as to keep the output of the integrator unchanged when detecting the electric amplitude and connecting the contact a4 with the contact c4 so as to input the signal from the differential amplifier 10 when integrating, the constant voltage source 12 outputting an electric signal having a zero value to the integrator 11, an adjusting signal source 13 outputting an adjusting signal for use in adjusting a reactance value, an adder 14 adding the adjusting signal and the controlling signal to output the added signal to the variable reactance section 7, an electric field detecting optical section 15 converting an electric field produced in a living body 121 to an electric signal, a signal processing section 16 amplifying the outputted signal from the electric field detecting optical section 15 and eliminating noise using a filter (not shown), a demodulation circuit 17 demodulating a received signal, a waveform shaping section 18 shaping a waveform, and a switch 1 connecting a contact a1 with a contact b1 so as to input the outputted signal from the signal processing portion at the time of reactance adjusting and transmitting and connecting the contact a1 with a contact c1 so as to input the signal to the demodulator 17 at the time of receiving.

Figure 6A:
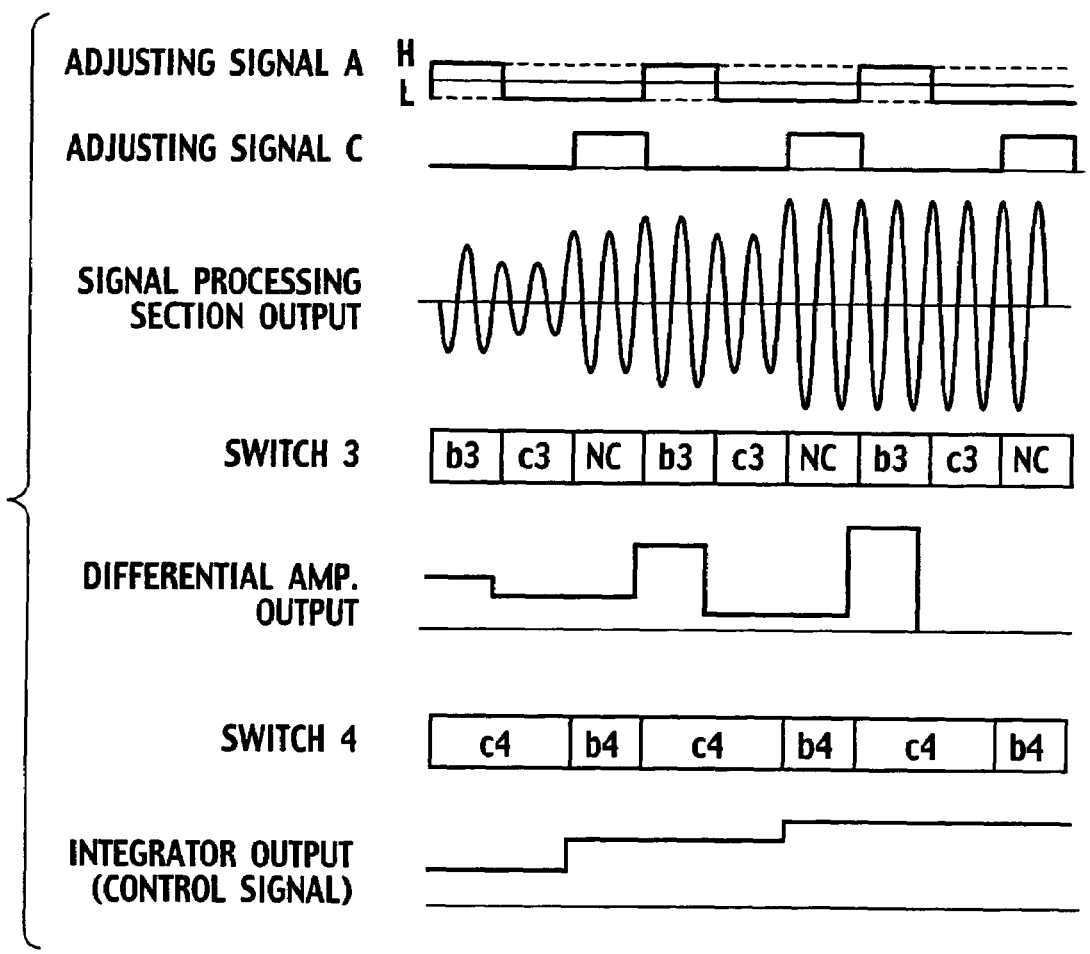
FIG. 6A illustrates a waveform outputted from each component or element of the transceiver according to the first embodiment of the present invention.
Figure 6B:
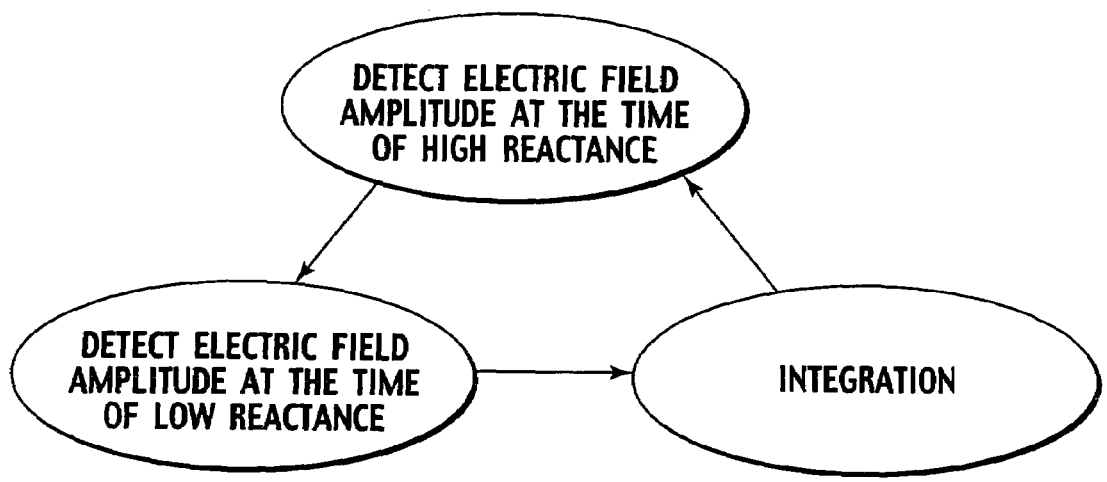
FIG. 6B is an explanatory drawing of an operation of the transceiver according to the first embodiment of the present invention.

Referring to FIGS. 5, 6A and 6B, an operation of the reactance adjuster in the transceiver according to the first embodiment will be described first. A predetermined signal outputted by the oscillator 5 and the modulation circuit 6 is supplied to a transmitting-and-receiving electrode 123 via the switch 2 and the variable reactance section 7 and the electrode 123 induces an electric field based on the signal in the living body 121. The predetermined signal mentioned here can be arbitrarily selected as far as the signal is suitable for adjusting a reactance value. For example, the predetermined signal may be a carrier outputted from the oscillator 5 or a modulated signal obtained by modulating the carrier according to data to be transmitted. In addition, there can be provided a signal generation section that is separated from the oscillator 5 and modulation circuit 6.

The electric field is received by the electric field detecting optical section via the transmitting-and-receiving electrode 123 and transformed into an electric signal. This electric signal is treated by the signal processing section 16 so that noise is eliminated therefrom and then led to the switch 3 via the detector 8 and the filter 9 by connection between the contacts a1 and b1 in the switch 1. The detector 8 has functions of transforming the electric signal from the signal processing section 16 into a direct voltage according to an amplitude of the signal and eliminating a higher harmonics component from an electric voltage outputted from the detector 8.

On the other hand, whilst the predetermined signal concerned is supplied to the transmitting-and-receiving electrode 123, a high level signal (H) and a low level signal (L) as an adjusting signal A are alternatively applied to the variable reactance section 7 via the adder 14 (FIG. 6A). An application of the adjusting signal A causes a reactance of the variable reactance section 7 to change. In the following description, unless otherwise noted, when the high level signal from the adjusting signal source 13 is applied to the variable reactance section 7, the reactance of the variable reactance section 7 becomes higher, and when the low level signal from the adjusting signal source 13 is applied to the variable reactance section 7, the reactance becomes lower.

An adjusting signal B for controlling a switching of the switch 3 is outputted from the adjusting signal source 13 in synchronization with the adjusting signal A. Specifically, when the adjusting signal source 13 outputs a high level signal to the variable reactance section 7, the contacts a3 and b3 are connected in the switch 3. This connection allows the capacitor C1 to be charged by the direct voltage obtained by the detector 8 converting the electric signal, when the adjusting signal source 13 outputs a high level signal. On the other hand, when the adjusting signal source 13 outputs a low level signal, the capacitor C2 is charged by the direct voltage based on the electric signal.

While either one of the capacitors C1 and C2 is charged, the contacts a4 and c4 are connected in the switch 4 by an adjusting signal C from the adjusting signal source 13. Therefore, the zero voltage from the constant voltage source 12 is inputted into the integrator 11 and the output of the integrator 11 is not varied. When the charging of the capacitors C1 and C2 ends, the contacts a4 and b4 in the switch 4 are connected according to the adjusting signal C. Therefore, a voltage (voltage having a predetermined voltage value) based on the difference between the voltages across the capacitors C1 and C2 is inputted to the integrator 11 from the differential amplifier 10.

In the transceiver according to the first embodiment of the present invention, as shown in FIGS. 6A and 6B, in order to keep the output of the integrator 11 unchanged while detecting an electric field amplitude by providing the switch 4 between the differential amplifier 10 and the integrator 11, an operation cycle of "a detection of an electric field amplitude when a reactance is high", "a detection of an electric field amplitude when a reactance is low", and "an integrating of the difference between the two amplitudes" is realized. When the reactance is high, the contacts a3 and c3 are connected, thereby charging the capacitor C2 with the signal of which field amplitude is detected by the detector 8 and the filter 9. When the reactance is low, the contacts a3 and c3 are connected, thereby charging the capacitor C2 with the amplitude-detected signal. During these periods, the contact a4 is connected to the contact c4 connected to the constant voltage source 12 for transmitting a signal having zero value to the integrator 11 in the switch 4, thereby keeping the output of the integrator 11 unchanged. After the detection of the amplitude, the contact a3 is connected to neither the contact b3 nor the contact c3 in the switch 3, whereas the contact a4 and the contact b4 are connected to performing integration. By the way, NCs representing one connection state of the switch 3 in FIG. 6A show that the contact a3 is connected to neither the contact b1 nor the contact c1.

According to the above operation, since the output (control signal) of the integrator 11 is unchanged during the detection of an electric field amplitude, even when a change of the control signal is larger than the amplitude of the adjusting signal A, a relation between a swing of the reactance value and the adjusting signal A is not inversed so that a normal operation is feasible. As a result, time required to determine the maximum value is shortened, thereby realizing a stable and effective data transmission at high speed.

While FIG. 6A illustrates where the adjusting signal A is set as a low level during integration during the adjusting signal C being a high level, the normal operation is realized even when the signal A can be set as a high level. In addition, there can be used a signal from an oscillating device as a signal source that generates the adjusting signals A, B, and C. Moreover, while the capacitors C1 and C2 are used in order to store an electric signal representative of the electric field amplitude, another storing means is feasible in order to realize the same operation. For example, a memory device can be used as the storing means.

Under the circumstances in which the reactance is appropriately controlled, a signal to be transmitted is outputted to the modulation circuit 6 via an I/O circuit 122 and thus a modulated signal is obtained by modulating the carrier supplied from the oscillator 5 based upon the signal to be transmitted, thereby inducing an electric field according to the modulated signal inside the living body 121.

Moreover, the contacts a1 and c1 are connected in the switch 1, thereby providing an electric signal from the electric field detecting optical section 15 to the demodulation circuit 17. A signal to be received, which is contained in the electric signal, is demodulated by the demodulation circuit 17, wave-formed by the waveform shaping section 18, and then supplied to a computer via the I/O circuit 122, the computer managing a signal to be transmitted or received. In this manner, an information communication is realized between a transceiver and another with the living body 121 interposed therebetween.

By the way, when another modulation method, for example, phase modulation or frequency modulation, in which the amplitude of the carrier is kept constant, is adopted, the amplitude value is allowed to change since the amplitude does not have any information. Therefore, in this case, the output of the adjusting signal source needs not to be terminated during a transmission of data.

As modifications of the transceiver according to the first embodiment, the integrator 11 having the following configuration will be described hereinafter.

(A First Modification)

Figure 7:
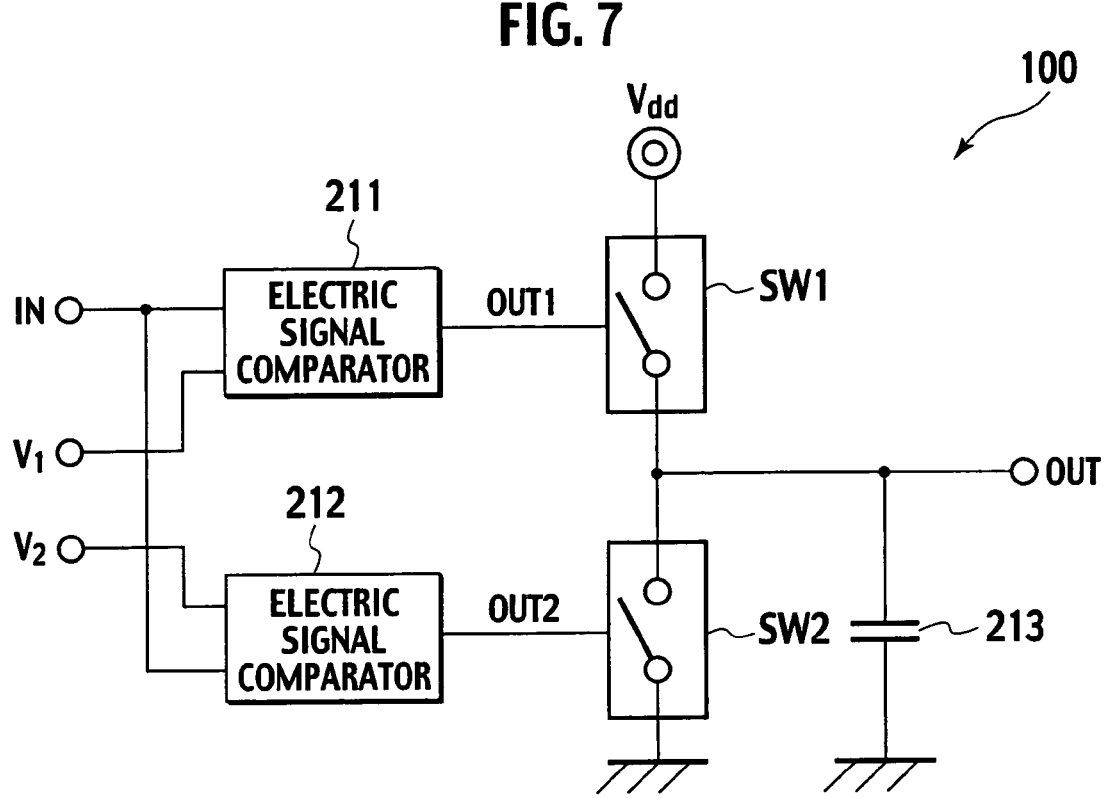
FIG. 7 is a block diagram illustrating a configuration of a signal processing circuit preferable as an integrator of the transceiver according to the first embodiment of the present invention.

FIG. 7 is a circuit block diagram illustrating a signal processing circuit suitable as an integrator of the transceiver according to the first embodiment. In a signal processing circuit 100, a voltage V1 having a slightly lower voltage value than a target voltage value and a voltage V2 having a slightly higher voltage value than the target voltage value are used as threshold voltages. The signal processing circuit 100 is designed so that both switches SW1 and SW2 are in positive logic in the signal processing circuit 100, an electrical signal comparator 11 exhibits a higher voltage when an input voltage is lower than V1 and an electric signal comparator 12 exhibits a higher voltage when an input voltage is higher than V2.

Specifically, the signal processing circuit 100 has the following configuration. Namely, the signal processing circuit 100 is comprised of an electric signal comparator 211 that compares an input voltage IN inputted from outside with the threshold V1 and outputs a signal OUT1 to turn on the switch SW1 as a first connection means when the input voltage IN is lower than the threshold voltage V1, an electric signal comparator 212 that compares the input voltage IN with the threshold V2 and outputs a signal OUT2 to turn on the switch SW2 as a second connection means when the input voltage IN is higher than the threshold voltage V2, and a capacitor 213 storing an electric charge so as to maintain an output voltage.

The input voltage IN is a voltage having a predetermined voltage supplied from the constant voltage source 12 via the switch 4 (FIG. 5) in the transceiver according to the first embodiment or a voltage from the differential amplifier 10. The voltage across the capacitor 213 is applied to the variable reactance section 7 (FIG. 5) of the transceiver.

Figure 8:
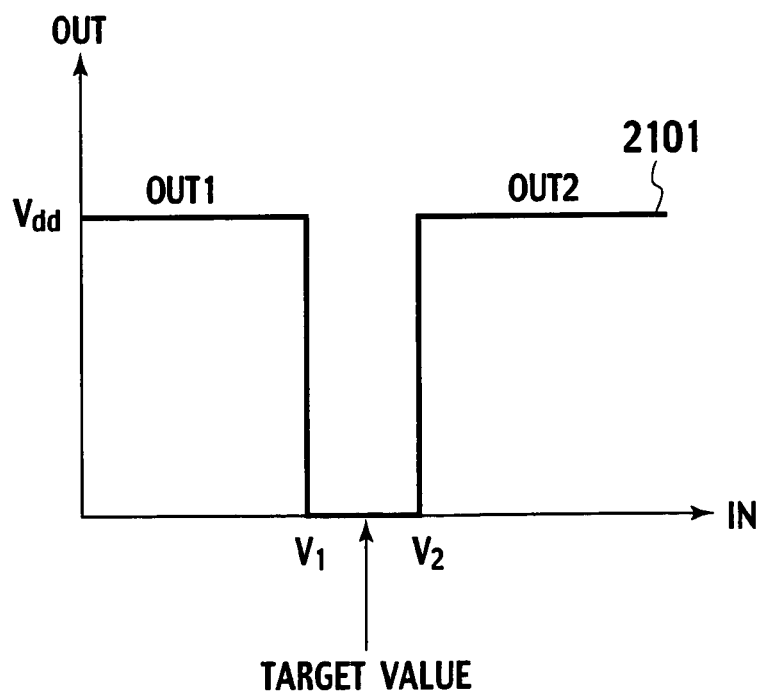
FIG. 8 illustrates a relation between an output voltage (OUT1, OUT2) of an electric signal comparator and an input voltage (IN) in the signal processing circuit in FIG. 7.

FIG. 8 illustrates a relation between an output voltage OUT1 or OUT2 (vertical axis) outputted from an electric signal comparator and an input voltage IN (horizontal axis) in the signal processing circuit.

According to a line 2101 shown in FIG. 8, when the input voltage IN has a voltage value between a range of the threshold voltage V1 and the threshold voltage V2, the range including a target voltage value, the electric signal comparators 211 and 212 do not output the signal OUT1 and OUT2, thereby turning off the switches SW1 and SW2 (open). Therefore, the output voltage remains unchanged and thus a large current does not flow.

On the other hand, when the input voltage IN is lower than the threshold V1, the signal OUT1 is outputted to turn on the switch SW1 and the switch SW2 is kept off. Therefore, an electric charge is transferred from a voltage source Vdd to the capacitor 213 through the switch 1, thereby increasing a voltage across the capacitor 213 so as to be equal to the voltage of the voltage source Vdd.

In addition, when the input voltage IN is higher than the threshold voltage V2, the signal OUT2 is outputted to turn on the switch 2 and the switch SW1 is kept off. In this case, the electric charge stored in the capacitor 213 is transferred to the earth ground through the switch 2, thereby decreasing a voltage across the capacitor 213.

By the way, in the transceiver that uses the signal processing circuit 100 as the integrator, while either the electric charge storing means C1 or C2 (FIG. 5) is storing electric charge, the contacts a4 and c4 are connected in the switch 4, thereby providing the voltage of the constant voltage source 12 to the signal processing circuit 100. This voltage has a voltage value between the thresholds V1 and V2. Therefore, when the electric charge means C1 and C2 are storing electric charge, neither the switch SW1 nor the switch SW2 is on, thereby maintaining the output voltage (the control signal) of the signal processing circuit 100 at a voltage across the terminals of the capacitor 213.

According to the signal processing circuit 100 described above as the integrator 11, neither the switch SW1 nor the switch SW2 is turned on, no large current flows from the voltage source Vdd to the earth ground, thereby preventing a power consumption from increasing. Therefore, there is provided a signal processing circuit suitable for circuit integration.

(A Second Modification)

Figure 9:
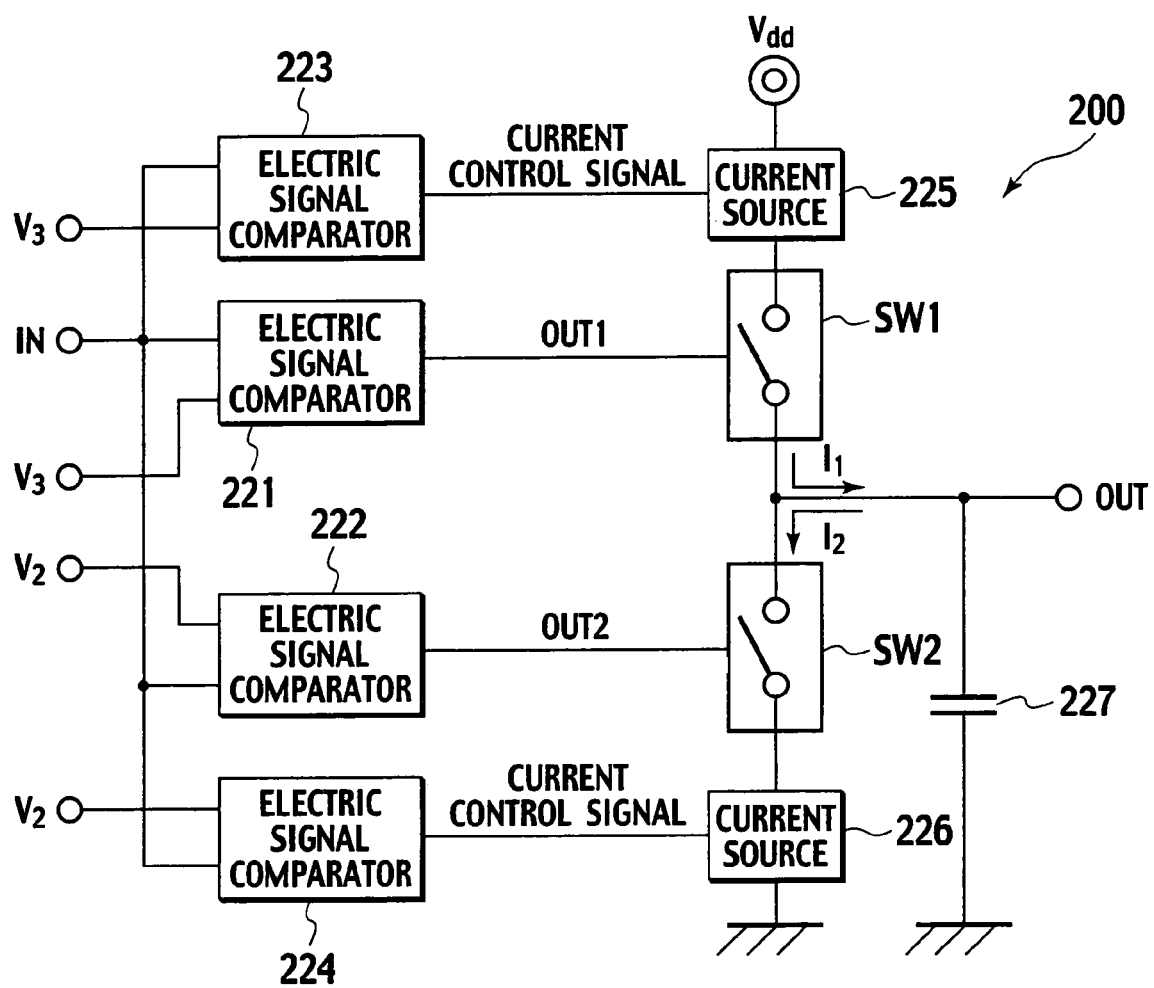
FIG. 9 is a circuit block diagram illustrating a configuration of a signal processing circuit preferable as an integrator of the transceiver according to the first embodiment of the present invention.

FIG. 9 is a circuit block diagram illustrating a configuration of another signal processing circuit preferable as an integrator for use in the transceiver according to the first embodiment of the present invention. Referring to FIG. 9, a signal processing circuit 200 is characterized in that, there is a current source 225 between the positive electrode of a power source Vdd and the switch SW1, there is a current source 226 between the earth ground and the switch SW2, and thereby electric signal comparators 223 and 224 output a current control signal to the current sources 225 and 226, respectively, to adjust a control signal. In addition, in the signal processing circuit 200, the switches SW1 and SW2 are in positive logic.

By the way, the signal processing circuit 200 is substantially the same as the signal processing circuit 100 described above in that the signal processing circuit 200 is comprised of an electric signal comparator 221 that compares an input voltage IN inputted from outside with the threshold V1 and outputs the signal OUT1 to turn on the switch SW1 as a first connection means when the input voltage IN is lower than the threshold voltage V1, an electric signal comparator 222 that compares the input voltage IN with the threshold V2 and outputs an signal OUT2 to turn on the switch SW2 as a second connection means when the input voltage IN is higher than the threshold voltage V2, and a capacitor 227 storing an electric charge so as to maintain an output voltage.

In addition, the input voltage IN is a voltage having a predetermined voltage value, which is supplied from the constant voltage source 12 via the switch 4 (FIG. 5), or a voltage supplied from the differential amplifier 10 via the switch 4. Moreover, a voltage across the terminals of the capacitor 213 is applied to the variable reactance section 7 (FIG. 5) of the transceiver, as is the case with the signal processing circuit 100.

In addition to the above features, the signal processing circuit 200 is further comprised of an electric signal comparator 223 that compares the input voltage IN with a third threshold value V3 (<V1) and outputs a current control signal to cause the current source 225 to flow a large current when the input voltage NI is lower than the third threshold value V3, and an electric signal comparator 224 that compares the input voltage with a fourth threshold voltage V4 (>V2) and outputs a current control signal to cause the current source 226 to flow a large current when the input voltage IN is higher than the fourth threshold voltage V4.

An operation of the signal processing circuit 200 having the above configuration will be described hereinafter. The two current sources 225 and 226 that are connected in series with the switches SW1 and SW2, respectively, output a current having a different current value, depending on the current control signal of 1 or 0 outputted from the electric signal comparators 223 and 224 that are connected to the current sources 225 and 226, respectively.

Figure 10:
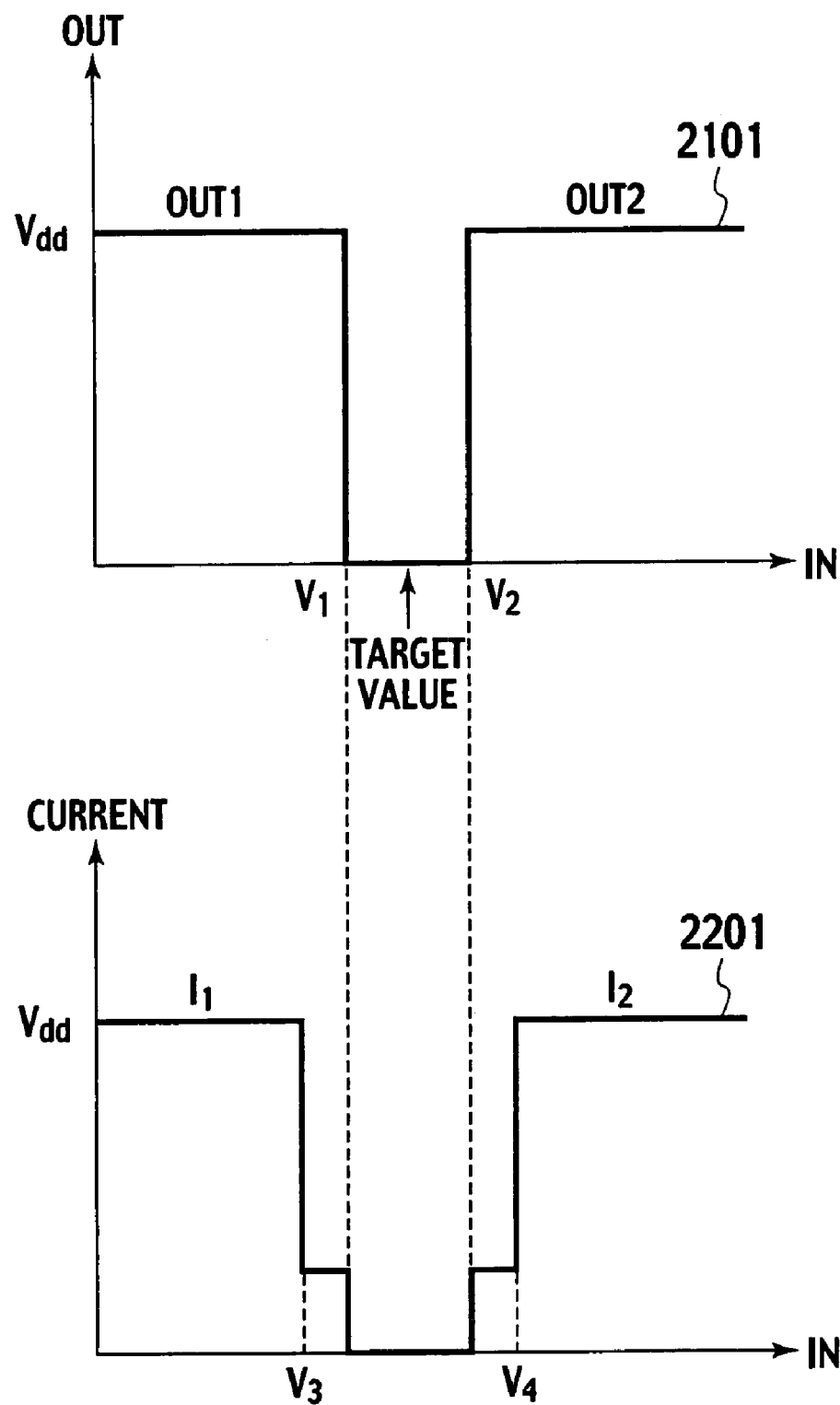
FIG. 10 illustrates relations between an output signal (OUT1, OUT2) of an electric signal comparator and an input voltage (IN) and between a current (I1, I2) flown from a current source and an input voltage in the signal processing circuit in FIG. 9.

FIG. 10 illustrates a relation between a current I1 flowing through the switch 1 and a current I2 flowing through the switch 2, in which a positive direction of each current is in accordance with an arrow shown in FIG. 9.

According to a ling 2201 in FIG. 10, when the input voltage is lower than V3, the current control signal having a value of 1 is outputted from the electric signal comparator 223 to the current source 225. In response to this, the current I1 (a first constant current) flows from the current source 225 as shown by the line 2201 in FIG. 10. As a result, an output voltage (across a capacitor 227) is increased.

When the input voltage is higher than V3 and lower than V1, the current control signal having a value of 0 is outputted from the electric signal comparator 223 to the current source 225 and thus a current (a second constant current) having a lower current value than the current Ii flows from the current source 225. As a result, the output voltage increases gradually, compared with the case where the current I1 flows from the current source 225.

As shown in FIG. 10, a current having a high or a low current value flows from the current source 225 depending whether the current control signal value outputted from the electric signal comparator 223 is 1 or 0. Namely, when the input voltage deviates largely from the target value, the current having a large current value flows from the current source 225 and then the output voltage (the capacitor 227) increases swiftly, and when the input voltage deviates slightly from the target value, the current having a low current value flows from the current source 225 and then the output voltage increases gradually.

On the other hand, when the input voltage is higher than V4, the electric signal comparator 224 outputs the current control signal of 1 and thus the current source 226 flows a large current I2 (a third constant current). As a result, the output signal decreases swiftly. By the way, the current value of the current I2 can be the same as that of the current I1 (the first constant current).

When the input voltage is higher than V2 and lower than V4, the electric signal comparator 224 outputs a current control signal having a value of 0 to the current source 226 and then the current source 226 flows a current (a fourth constant current) having a lower current value than the current I2. Therefore, the electric charge stored in the capacitor 227 discharges to the earth ground more slowly compared with the case where the current I2 flows from the current source 226, thereby decreasing gradually the output voltage. By the way, the fourth constant current can have the same current value as the second constant current.

The current source 226 outputs a current having a large or a small current value depending whether the current control signal outputted from the electric signal comparator 224 is 1 or 0, as is the case with the current source 225.

By using the current sources 225 and 226 having such a function, when a deviation between the input voltage and the target value is large, a current having a large current value flows, thereby changing the output voltage swiftly, and when the deviation is small, a current having a low current flows, thereby changing the output voltage slowly. Therefore, the circuit operates with a higher stability.

In summary, according to the signal processing circuit 200 described above as the integrator 11, the same effect as the above signal processing circuit 100 is obtained.

In addition, according to the signal processing circuit 200, since the current sources are connected in series with the switches, the output voltage can be changed depending on the deviation between the input voltage and the target value, thereby further improving a stability of the signal processing circuit.

(A Third Modification)

Figure 11:
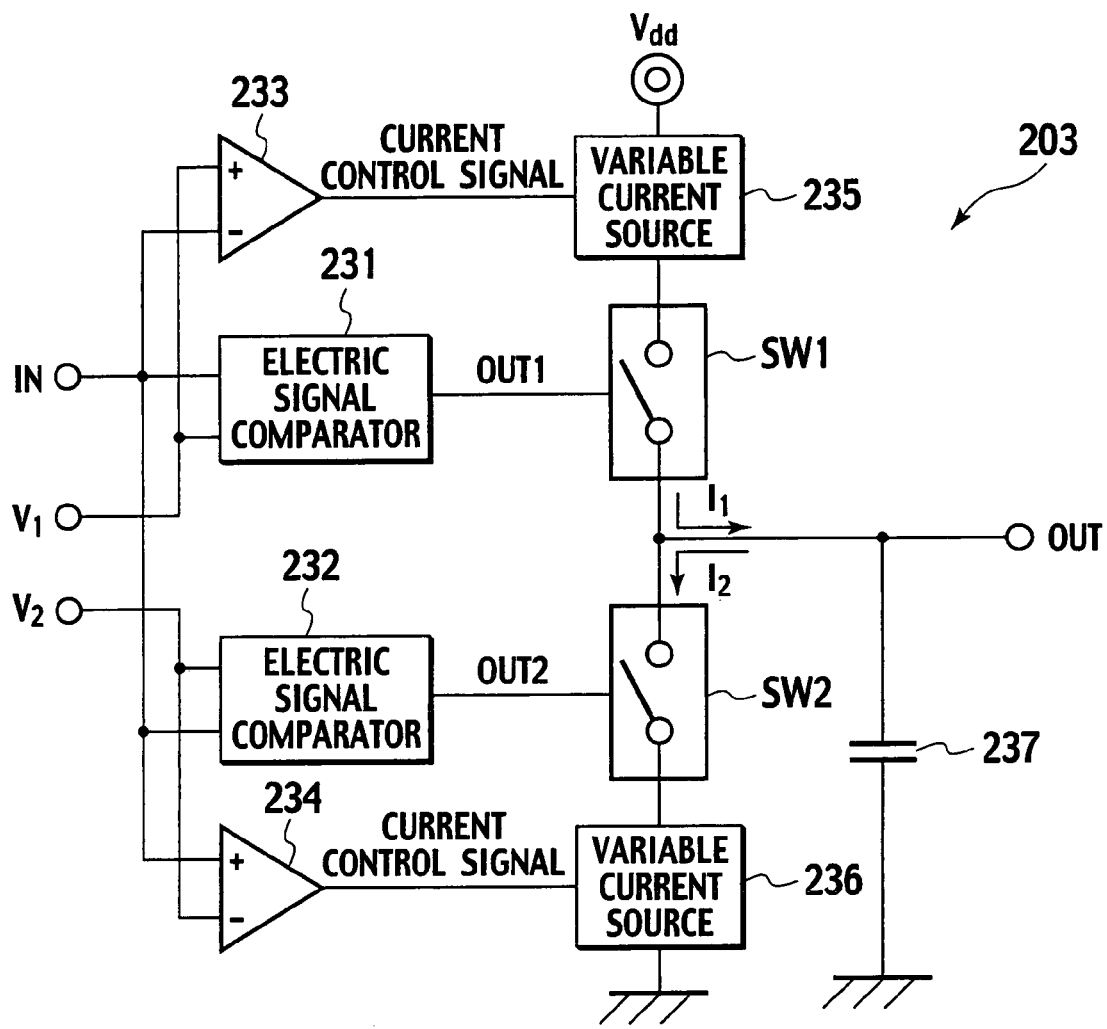
FIG. 11 is a circuit block diagram illustrating a configuration of a signal processing circuit preferable as an integrator of the transceiver according to the first embodiment of the present invention.

FIG. 11 is a circuit block diagram illustrating yet another signal processing circuit suitable as the integrator 11 of the transceiver according to the first embodiment of the present invention. As shown in FIG. 11, in a signal processing circuit 203, there is connected a variable current source 235 between the switch SW1 and the positive electrode of the voltage source Vdd and there is connected a variable current source 236 between the switch SW2 and the earth ground, wherein an electric control signal is inputted to the variable current sources 235 and 236 from the differential amplifiers 233 and 234, respectively. The differential amplifier 233 inputs the threshold V1 (a positive phase input) and the input voltage IN (a negative phase input) and outputs a current control signal to the variable current source 235 so that the larger the difference between the threshold V1 and the input voltage IN is, the larger the current flows from the variable current source 235. The differential amplifier 234 inputs the input voltage IN (a positive phase input) and the threshold V2 (a negative phase input) and outputs a current control signal to the variable current source 236 so that the larger the difference between the input voltage IN and the threshold V2 is, the larger the current flows from the variable current source 236.

By the way, also in the signal processing circuit 203, the switches SW1 and SW2 are both in positive phase.

In addition, the signal processing circuit 203 is composed of an electric signal comparator 231 that compares the first threshold V1 and the input voltage IN and outputs a signal OUT1 to turn on the switch SW1 when the input voltage IN is lower than the threshold V1, an electric signal comparator 232 that compares the second threshold V2 and the input voltage IN and outputs a signal OUT2 to turn on the switch SW2 when the input voltage IN is higher than the threshold V2, and a capacitor 237 that stores electric charge so as to maintain the output voltage at constant as is the case with the above signal processing circuits 100 and 200.

Figure 12:
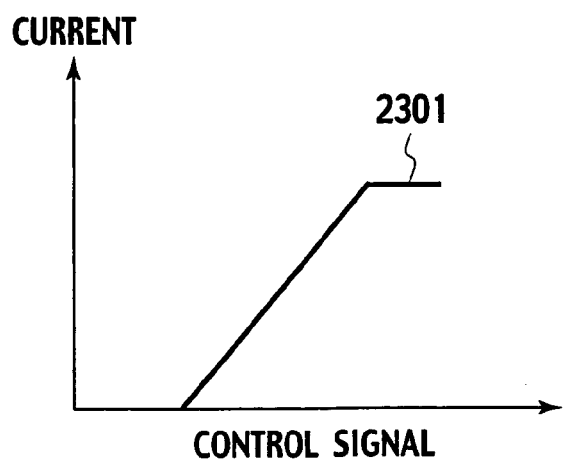
FIG. 12 illustrates a relation between a current control signal and a current flown from a variable current source.

In the signal processing circuit 203, since the current control signal outputted to the variable current sources 235 and 236 respectively from the differential amplifiers 233 and 234 change continuously, as a relation between the current control signal and the current outputted from the variable current source is shown by a characteristic line 301 in FIG. 12, a current value of the current from the current source changes continuously in accordance with the current control signal.

Figure 13:
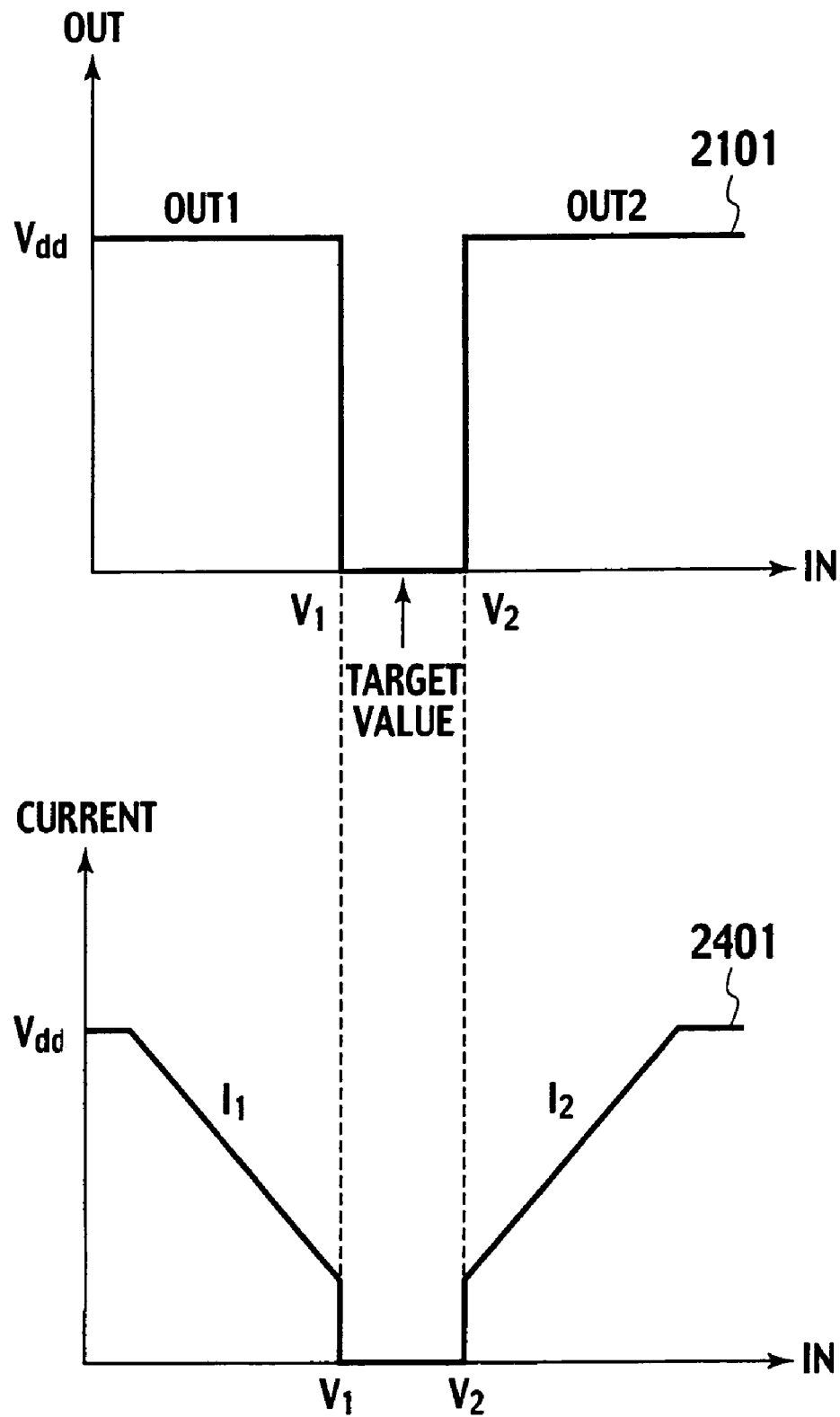
FIG. 13 illustrates relations between an output signal (OUT1, OUT2) of an electric signal comparator and an input signal (IN) and between a current (I1, I2) flown from a current source and an input signal in the signal processing circuit in FIG. 11.

FIG. 13 illustrates a relation between the input voltage IN and the currents Ii and I2 outputted from a variable current source when the variable current source that has a characteristic line 2301 shown in FIG. 12. As stated above, the input voltage IN is inputted to the two differential amplifiers 233 and 234 in an opposite phase with each other. Specifically, the input voltage IN is inputted, on one hand, to the inverting terminal (−) of the differential amplifier 233 and, on the other hand, to the non-inverting terminal (+) of the differential amplifier 235. As a result, a line 2401 that is symmetrical to an axis passing through the target value is obtained as shown in FIG. 7. Nothing to say that the absolute slop of the line 2401 representing the current values I1 and I2 is the same as the absolute slope of the line shown in FIG. 12.

When the input voltage IN is lower than the threshold V1, the differential amplifier 233 outputs a current control signal to the variable current source 235 in a manner that the lower the input voltage IN is than the threshold V1, the larger the current from the variable current source 235 becomes. Therefore, the larger the current flows from the current source 235, thereby increasing swiftly the output voltage. In addition, in the signal processing circuit 203, the higher the input voltage IN is, the smaller the current I1 becomes, thereby increasing the output slowly.

On the other hand, when the input voltage IN is higher than the threshold V2, the current source 236 flows the current I2, thereby reducing the output voltage. Namely, the higher the input voltage IN is, the more swiftly the output voltage is reduced.

When the input voltage IN is higher than the threshold V1 and lower than the threshold V2, no current flows, thereby maintaining the output voltage constant.

According to the signal processing circuit 203 described above as the integrator ii, the same effect as the above-stated signal processing circuit 100 is obtained.

In addition, according to the signal processing circuit 203, by connecting the variable current source in series with the switch, the output voltage can be changed depending on a deviation between the input voltage and the target value, thereby further improving a stability of the signal processing circuit.

(A Fourth Modification)

Instead of the current sources 235 and 236 provided in the third modification, a variable resistor can be provided. In this case, the electric signal comparators 233 and 234 are configured to output a current control signal to the variable resistor in a manner that the larger the difference between a predetermined voltage (IN) and constant voltages V1 or V2 is, the lower the resistance of the variable resistor becomes. With this, the larger the deviation between the predetermined voltage and the constant voltage is, the larger the current flows, thereby increasing the output voltage swiftly. When a difference between the predetermined voltage and the constant voltage is small, the resistance of the variable resistor becomes large, thereby changing the current value slowly. Therefore, the reactance adjusting is accomplished stably in a short time.

A Second Embodiment

Figure 14:
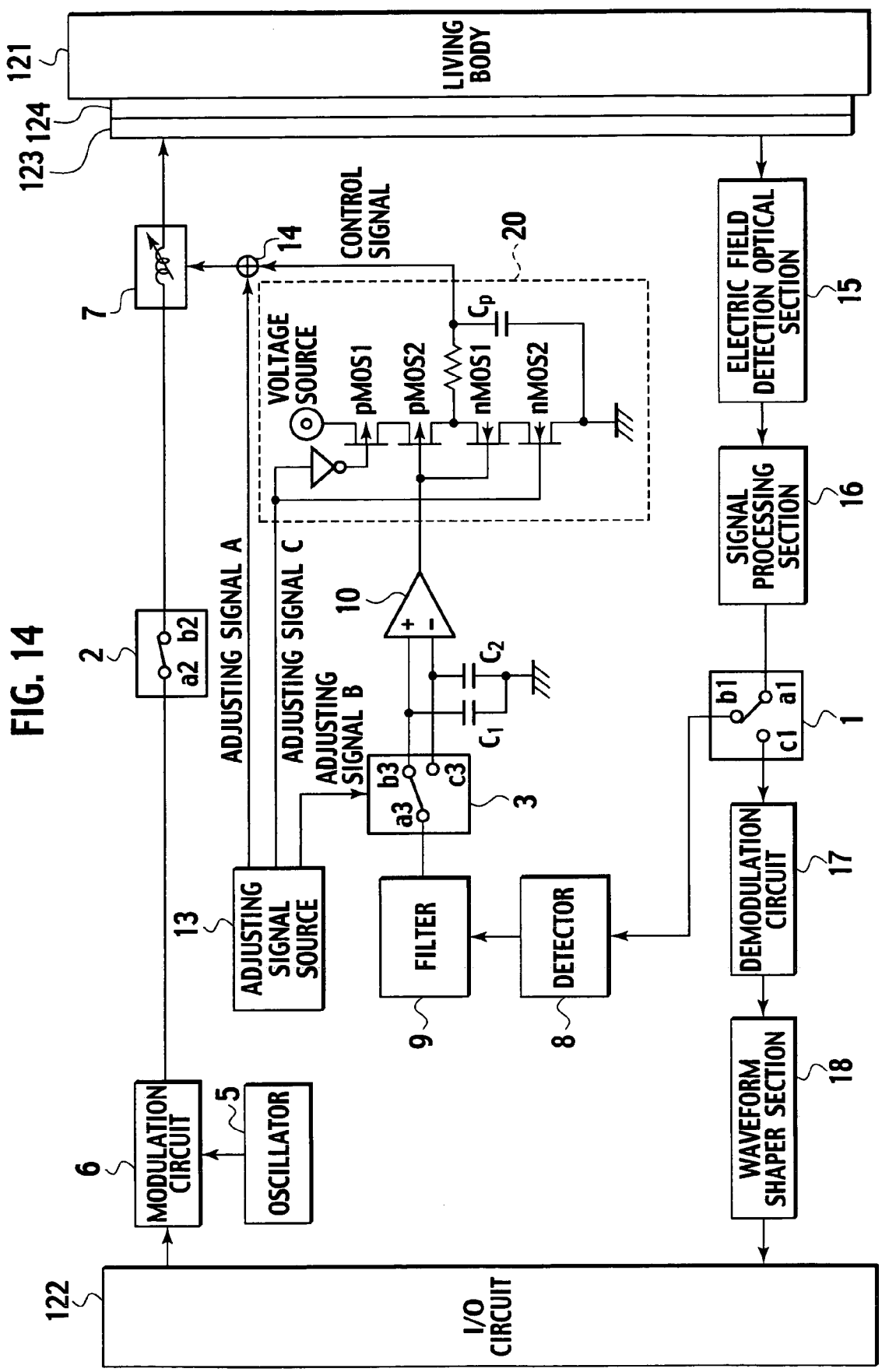
FIG. 14 is an overall block diagram of a transceiver according to a second embodiment of the present invention.

Next, a transceiver according to a second embodiment of the present invention will be described hereinafter. In the second embodiment, a specific configuration of an integrator is described. FIG. 14 illustrates a transceiver according to the second embodiment, in which a charge pump circuit is used as the integrator.

As shown in FIG. 14, an integrator 20 is composed of a pMOS1, a pMOS2, an nMOS1, and an nMOS2 that are connected in this order between the positive electrode of a voltage source for the integrator and the earth ground in series with one another, and a capacitor Cp that is connected between a node between the pMOS2 and the nMOS1 and the earth ground in series with the nMOS1 and the nMOS2. Here, pMOS indicates a p-channel MOS-FET (Metal Oxide Semiconductor Field Effect Transistor) and nMOS indicates an n-channel MOS-FET.

When the capacitors C1 and C2 are storing electric charge, the pMOS1 and the nMOS2 is off so as to prevent an output voltage (a voltage across a capacitor Cp) of the integrator 20 from changing. When the capacitors C1 and C2 stop storing electric charge, the pMOS1 and the nMOS2 is turned on.

Figure 16:
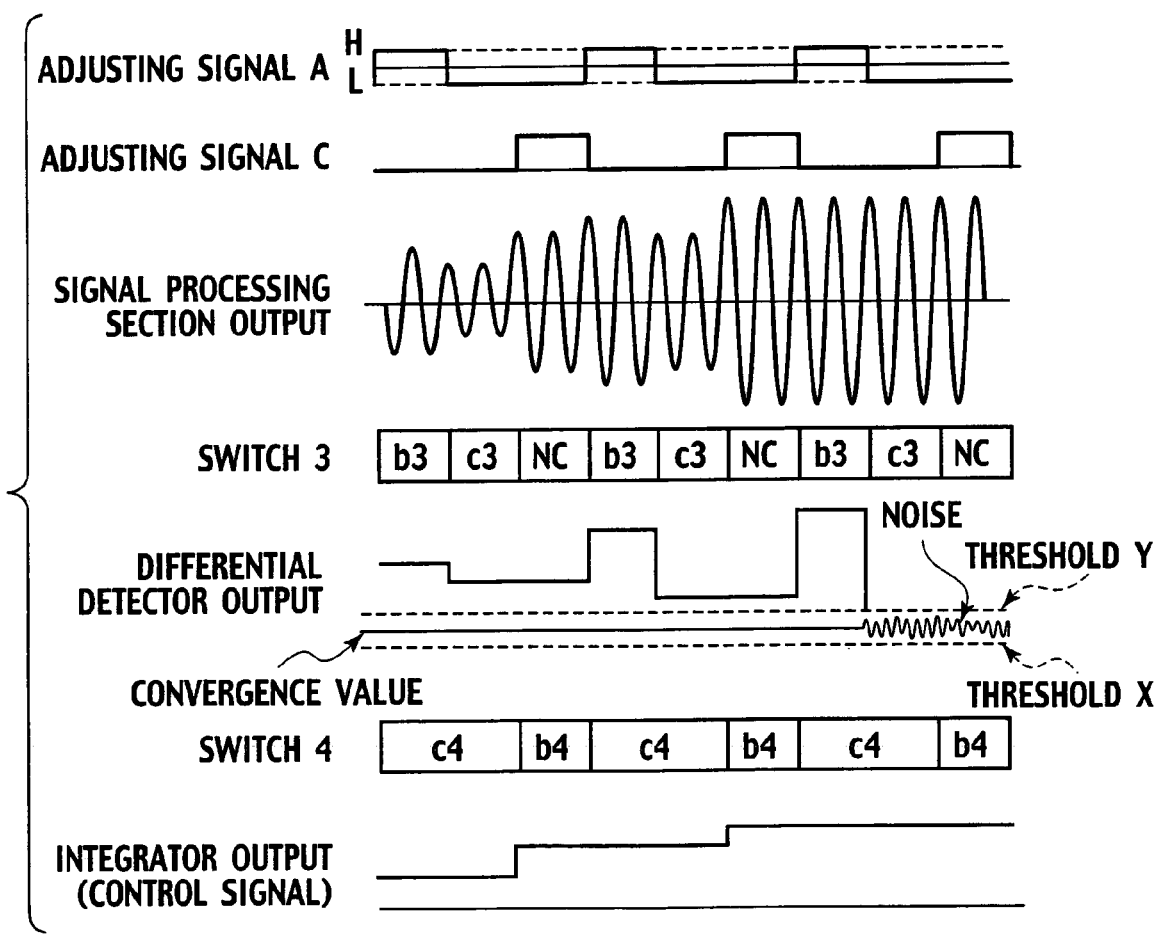
FIG. 16 is an explanatory drawing of an operation of the transceiver according to the third embodiment of the present invention.

By the way, as shown in FIG. 14, an adjusting signal C is inputted to the gate of pMOS1 from an adjusting signal source 13 via a voltage reversing device. To the gate of the nMOS2 is directly inputted the adjusting signal C from the adjusting current source 13. The adjusting signal C is a signal produced based on the adjusting signal B for controlling an electric charge storing by the capacitors C1 and C2. Namely, the adjusting signal source 13 outputs a low level signal as the adjusting signal C while the capacitors C1 and C2 are storing an electric charge and outputs a high level signal when the capacitor C1 and C2 terminates the electric charge stroing (FIG. 16). Therefore, the pMOS1 and the nMOS2 are controlled so as to be off while the capacitors C1 and C2 are storing electric charge and on when the electric charge storing ends.

On the other hand, to the gate of the pMOS2 and the nMOS1 is inputted a signal from a voltage comparator 10. The voltage comparator 10 compares a voltage across the capacitor C1 and a voltage across the capacitor C2 and outputs a low level signal when the voltage across the capacitor C1 is higher than that across the capacitor C2. Because of this, the pMOS2 is on and the nMOS1 is off. When the capacitors C1 and C2 stop storing an electric charge and the pMOS1 (and the nMOS2) is on by the adjusting signal C, an electric charge is transferred to the capacitor Cp via the pMOS1 and the pMOS2 from the voltage source, thereby increasing the control signal voltage.

The other way around, when the voltage across the capacitor C1 is lower than that across the capacitor C2, the voltage comparator 10 outputs a high level signal. Therefore, the pMOS2 is off and the nMOS1 is on. When the capacitors C1 and C2 stop storing an electric charge and the nMOS2 (and the pMOS1) is on by the adjusting signal C, an electric charge is transferred to the earth ground via the nMOS1 and the nMOS2, thereby reducing the control signal voltage.

When comparing the second embodiment with the first modification of the first embodiment, the pMOS2 has the same function as the switch SW1; the nMOS1 has the same function as the switch SW2; and the pMOS1 and the nMOS2 have the corresponding function as the switch 4. The pMOS1 and the nMOS2 are off when the adjusting signal C is at a low level and thus no electric charge is transferred. As a result, the output voltage (control signal) is maintained at the voltage across the capacitor Cp. In other words, in the transceiver according to this embodiment, the control signal is prevented from being fluctuated when the capacitors C1 and C2 are storing an electric charge without using the constant voltage source 12 in the first embodiment.

With the above configuration, the transceiver according to this embodiment exhibits the same effect as the transceiver according to the first embodiment.

Figure 15:
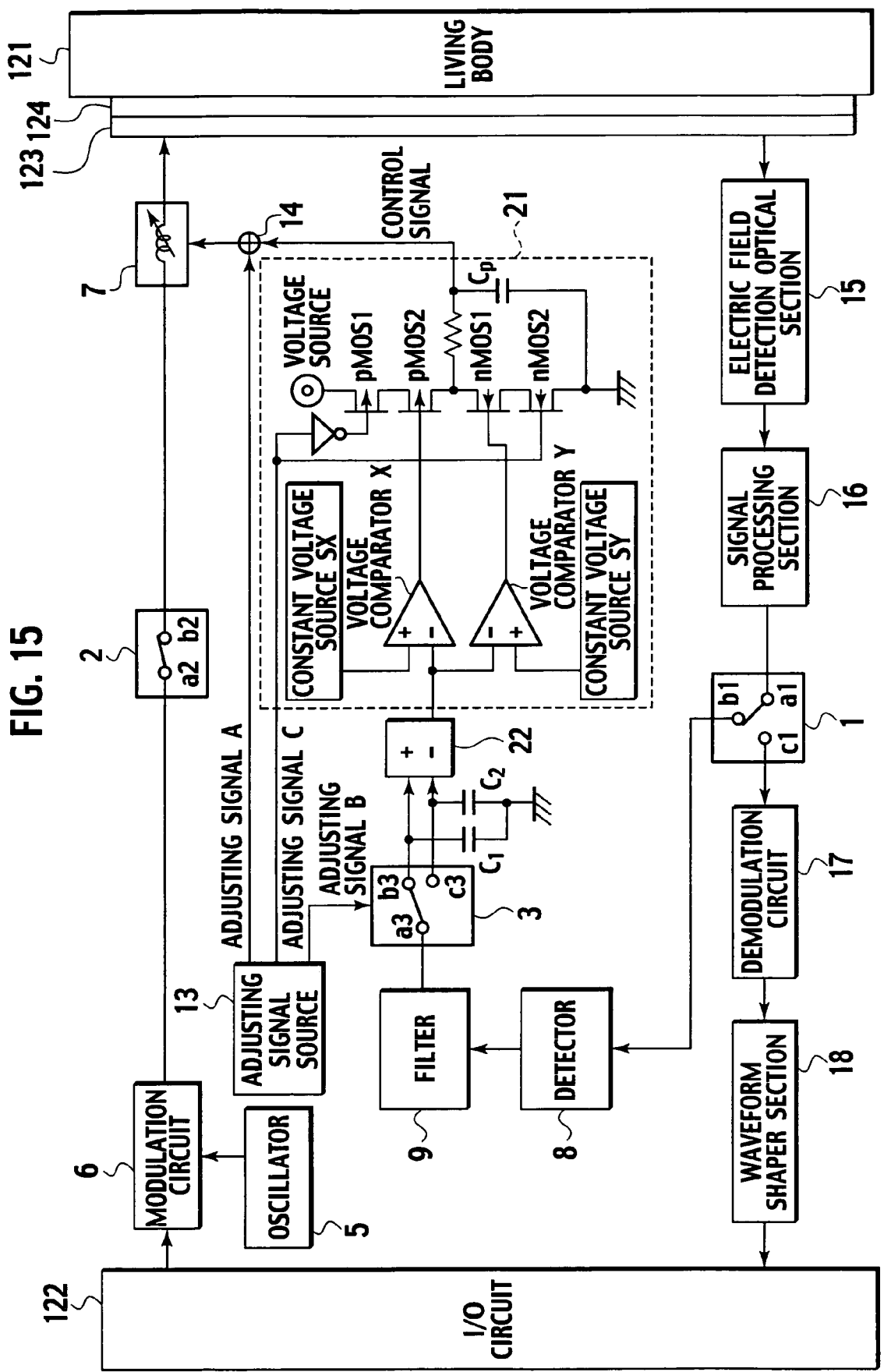
FIG. 15 is an overall block diagram of a transceiver according to a third embodiment of the present invention.

FIG. 15 illustrates a block diagram of a transceiver according to a third embodiment.

Referring to FIG. 15, the transceiver according to the third embodiment is comprised of a pMOS1 and an nMOS2 that are off so as not to change the output of an integrator during an amplitude detection and are on during an integration, a capacitor Cp for maintaining the output voltage (control signal), a constant voltage source SX outputting a threshold X (reference voltage), a constant voltage source SY outputting a threshold Y (reference voltage), a voltage comparator X outputting a voltage resulted by comparing the threshold X and the output of the differential detector 22, and a voltage comparator Y outputting a voltage resulted by comparing the input signal and the threshold Y.

The transceiver according to the third embodiment is provided with a voltage comparator X and a voltage comparator Y each having a threshold X and a threshold Y in a front stage of a charge pump circuit. The differential detector 22 performs a voltage level conversion so as to output a constant voltage when there is no difference between input signals. A constant voltage source SX and a constant voltage source SY shown in FIG. 15 are a signal source for providing respectively the voltage comparator X and the voltage comparator Y with a threshold. FIG. 16 illustrates a waveform of an output of each component during controlling. As shown in FIG. 16, the threshold X and the threshold Y are set so as to have a convergence value therebetween. Here, the convergence value of the differential detector 22 indicates an electric signal outputted when there is no difference between the input signals.

In a control section 21, when the voltage across the capacitor C1 is higher than that across the capacitor C2 and the output of the differential detector 22 is higher than the thresholds X and Y, since the voltage comparators X and Y output a low level signal, the pMOS2 is on and the nMOS1 is off. When the voltage across the capacitor C1 is substantially the same as that across the capacitor C2 and the output of the differential detector 22 lies between the threshold X and the threshold Y, since the output of the voltage comparator X is at a high level and the output of the voltage comparator Y is at a low level, both the pMOS2 and the nMOS1 are off. When the voltage across the capacitor C1 is lower than that across the capacitor C2 and the output of the differential detector 22 is lower than the threshold X and threshold Y, since the outputs of the voltage comparators X and Y are both at a high level, the pMOS2 is off and the nMOS1 is on.

Therefore, when the electric field amplitude at the time of a high reactance value is larger than the electric field amplitude at the time of a low reactance value, i.e., when the voltage across the capacitor C1 is higher than that across the capacitor C2, the control signal becomes large, and when smaller, the control signal becomes small. Therefore, the same operation as the control circuit according to the first embodiment is realized.

However, whereas the control signal continues to change until the electric field amplitude at the time of a large reactance value is completely the same as the electric field amplitude at the time of a small amplitude in the first embodiment, a difference between the two amplitudes is permissible in the third embodiment. Because of this, the control signal is not changed by an error in the electric field amplitude due to a noise caused in an electrical circuit or the like used in the transceiver (a differential detection output in FIG. 16). Therefore, compared with the transceiver according to the first embodiment, the transceiver according to the third embodiment has a higher stability in terms of noise.

A Fourth Embodiment

Figure 17:
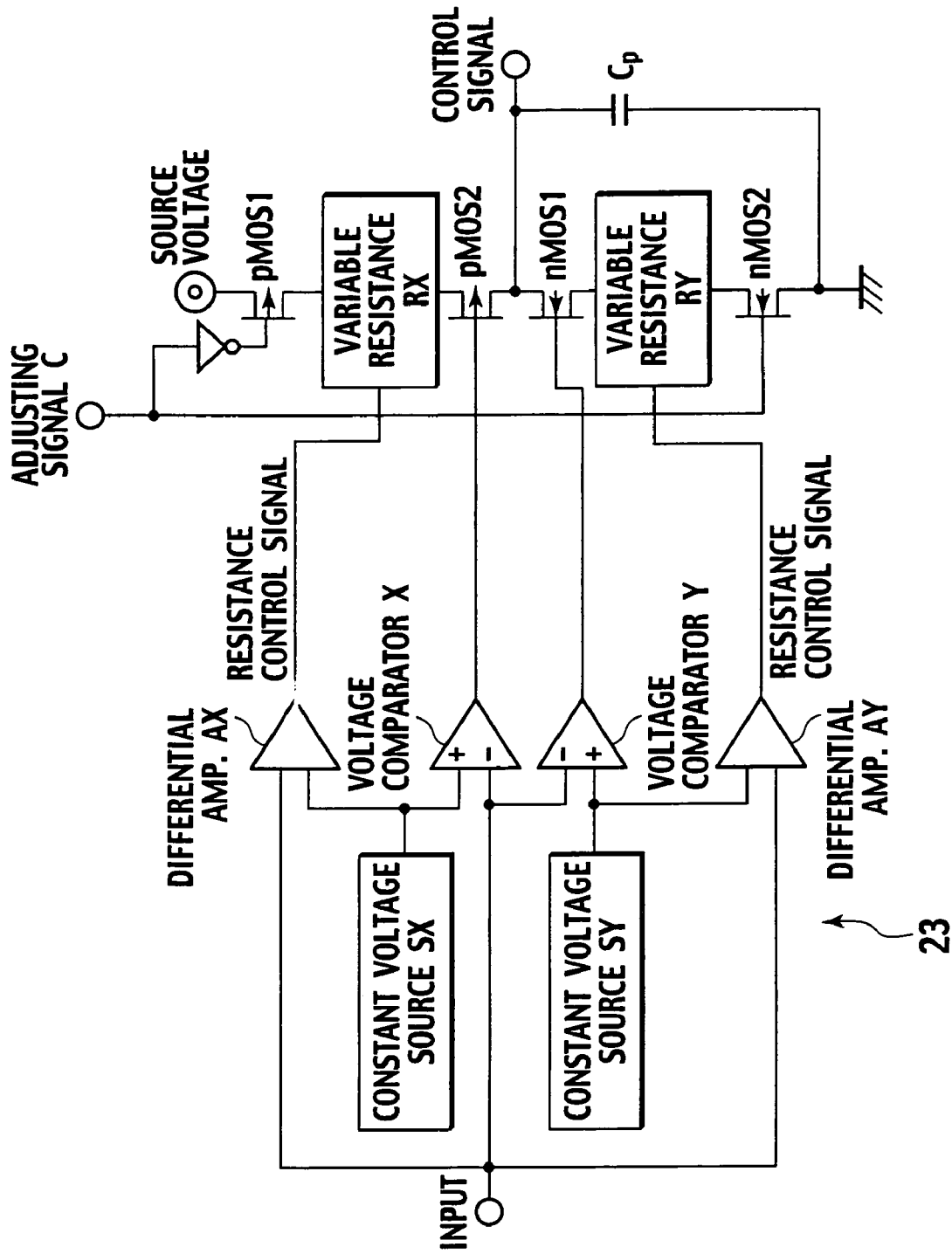
FIG. 17 is a schematic diagram of a control section of a transceiver according to a fourth embodiment of the present invention.

FIG. 17 is a schematic diagram of a control section 23 suitable for a transceiver according to a fourth embodiment. Referring to FIG. 17, the control section 23 has a pMOS1, a pMOS2, an nMOS1, an nMOS2, a capacitor Cp, a constant voltage source SX outputting a threshold X, and a constant voltage source SY outputting a threshold Y, as is the case with the control section 21 (FIG. 15) according to the third embodiment.

In addition, the control section 23 has a variable resistor RX provided between the pMOS1 and the pMOS2, a variable resistor RY provided between the nMOS1 and the nMOS2, a differential amplifier AX that compares an input voltage and the threshold X and outputs a signal for controlling a resistance value of the variable resistor RX, a differential amplifier AY that compares an input voltage and the threshold Y and outputs a signal for controlling a resistance value of the variable resistor SY.

Specifically, the differential amplifier AX outputs a resistance control signal to the variable resistor RX so that the larger the difference between the input voltage and the threshold X is, the lower the resistance of the variable resistor RX becomes. Because of this, the larger the difference between the input voltage and the threshold X is, the more swiftly an electric charge is transferred to the capacitor Cp from the voltage source. On the contrary, the differential amplifier AY outputs a resistance control signal to the variable resistor RY so that the larger the difference between the input voltage and the threshold Y is, the lower the resistance of the variable resistor becomes. Because of this, the larger the difference between the input voltage and the threshold Y is, the more swiftly an electric charge is transferred to the earth ground from the capacitor Cp.

Therefore, according to the control section 23, there is provided an integrator that is able to change a change rate of the control signal. Namely, the control section 23 is capable of increasing a change rate of the control signal (the voltage across the terminals of the capacity Cp) when the input voltage is far from the thresholds X and Y and reducing a change rate of the control signal when the input signal is in the vicinity of the threshold. Therefore, an optimal value of the reactance can be determined in a shorter time and thereby a stable control is realized.

A Fifth Embodiment

Figure 18:
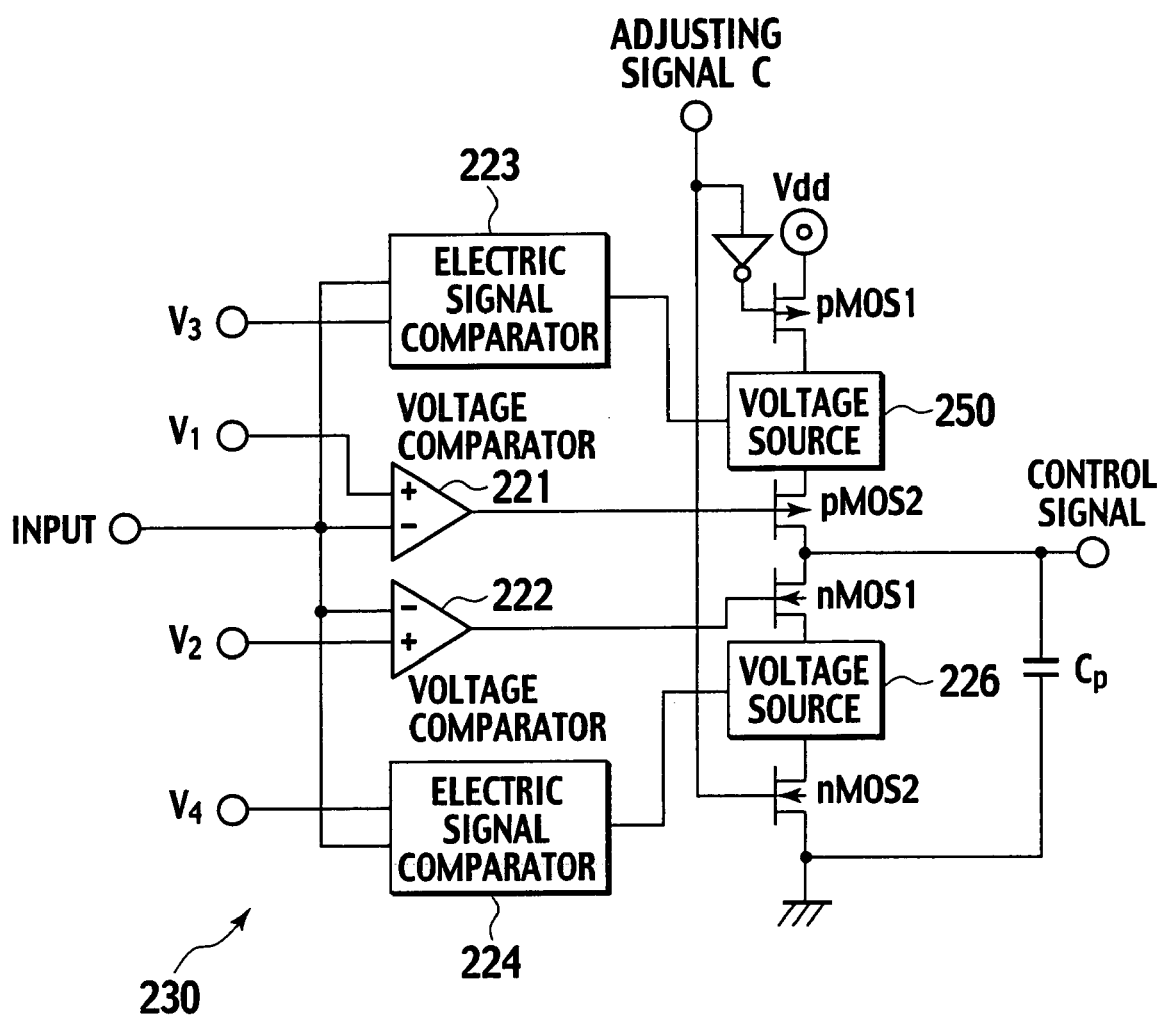
FIG. 18 is a schematic diagram of a control section preferable to a transceiver according to a fifth embodiment of the present invention.

FIG. 18 is a schematic diagram illustrating a control portion 230 suitable for a transceiver according to a fifth embodiment of the present invention. The control section 230 has a pMOS1, a pMOS2, an nMOS1, an nMOS2, a capacitor Cp, a constant voltage source outputting a constant voltage V1, and a constant voltage source outputting a constant voltage V2, as is the case with the control section 21 (FIG. 15) according to the third embodiment.

In addition, the control section 230 has a third constant voltage source outputting a constant voltage V3 lower than the constant voltage V1, a current source 250 connected between the pMOS1 and the pMOS2, an electric signal comparator 223 that compares an input voltage and the constant voltage V3 and outputs a current control signal to the current source 250 to cause the current source 250 to flow a first constant current when the input voltage is lower than the constant voltage V3 and a current control signal to the current source 250 to cause the current source 250 to flow a second constant current smaller than the second constant current when the input voltage is higher than the constant voltage V3 and lower than the constant voltage V1, a constant voltage source outputting a constant voltage V4 higher than the constant voltage V2, a current source 226 connected between the nMOS1 and the nMOS2, and a fourth electric signal comparator 224 that compares the input signal and the constant voltage V4 and outputs a current control signal to the current source 226 to cause the current source 226 to flow a third constant current when the input voltage is higher than the constant voltage V4 and to cause the current source 226 to flow a fourth constant current smaller than the third constant current when the input voltage is higher than the constant voltage V2 and lower than the constant voltage V4.

The control section 230 having the above configuration operates in the following manner. When the input voltage is lower than the constant voltage V3, i.e., when the input voltage deviates largely from the constant voltage V1, the electric signal comparator 223 outputs a current control signal to the current source 250 so that the current source 250 flows the first constant current to the pMOS2. When the input voltage is higher than the constant voltage V3 and lower than the constant voltage V1, i.e., when the input voltage deviates slightly from the constant voltage V1, the electric signal comparator 223 outputs a current control signal to the current source 250 so that the current source 250 flows the second constant current to pMOS2. Here, the first constant current is larger than the second constant current. Therefore, when there is a larger deviation between the input voltage and the constant voltage V1, a larger current flows from the current source 250, thereby charging the capacitor Cp in a shorter time. In addition, the electric signal comparator 224 and the current source 226 cooperatively operate in the same manner as above.

Therefore, according to the control section 230, when the input voltage deviates away from the constant voltage V1 or the constant voltage V2, the control signal (the voltage across the capacitor Cp) can change at a higher rate. When the input voltage is close to the constant voltage V1 or the constant voltage V2, the control signal can change at a lower rate. Therefore, the reactance is optimized in a shorter period and a high stability is realized.

By the way, a variable current source can be used instead of the current sources 225 and 226. In this case, the electric signal comparators 224 and 226 are configured so as to output a current control signal to the variable current source so that the larger the deviation between the input voltage and the constant voltage V1 or the constant voltage V2 is, the larger the current flows from the variable current source. For example, the electric signal comparators 224 and 226 are preferably a differential amplifier. This can make it possible that when the input voltage deviates largely from the constant voltage, a larger current can flow, thereby changing the output voltage swiftly. Also, when the deviation is small, a smaller current can flow, thereby changing the output voltage slowly. Therefore, the reactance is adjusted stably in a short period.

A Sixth Embodiment

Figure 19:
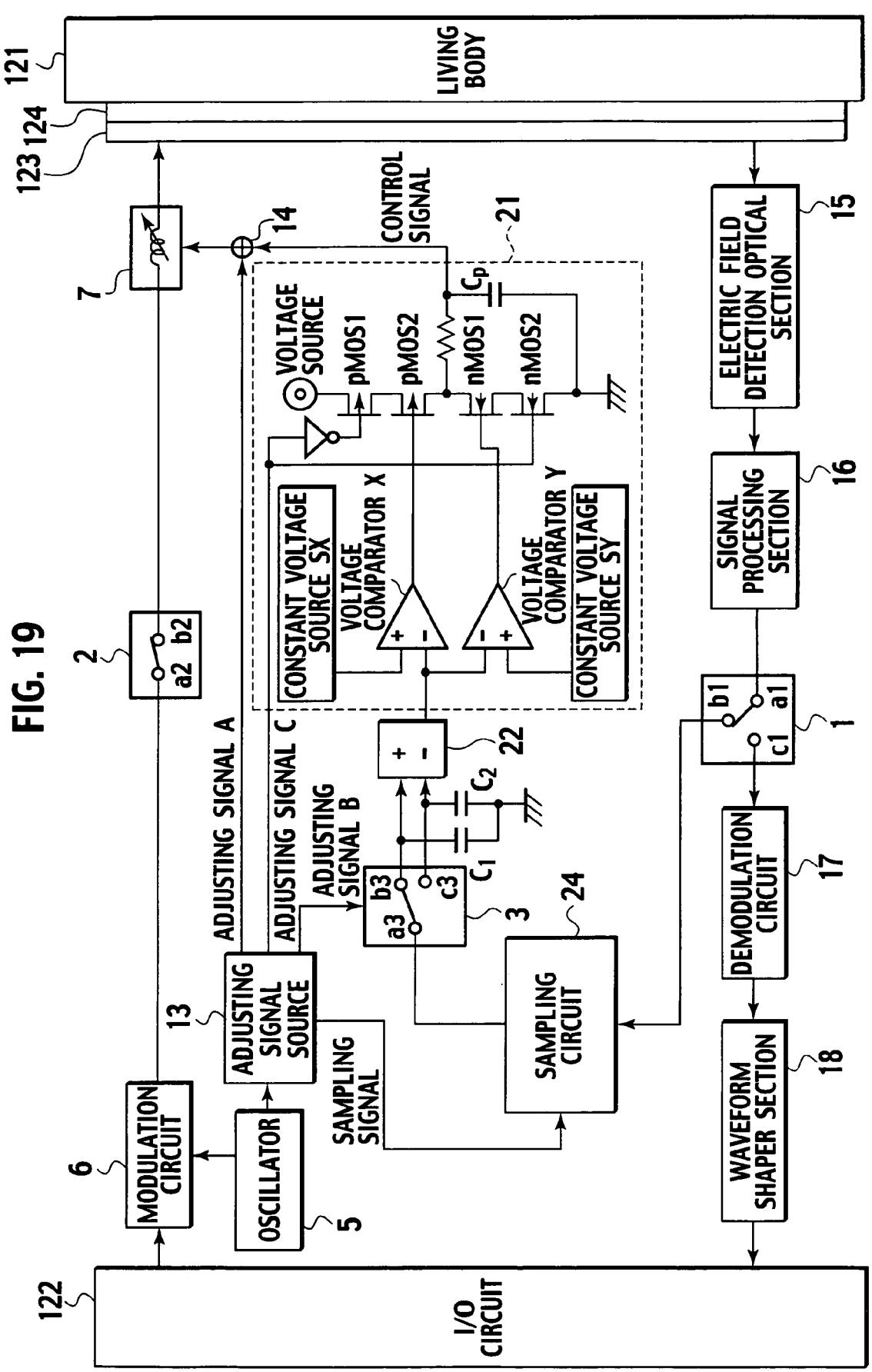
FIG. 19 is an overall schematic diagram of a configuration of a transceiver according to a sixth embodiment of the present invention.

FIG. 19 is a schematic diagram illustrating a configuration of a transceiver according to a sixth embodiment of the present invention. The transceiver according to the sixth embodiment uses a sampling circuit 24 in order to detect an amplitude of an electric signal detected by an electric field detection optical section 15 via a receiving-and-transmitting electrode 123. When configuring the transceiver with an integrated circuit (IC) device, a use of a filter that requires a large electro static capacity leads to a larger area of the IC device, thereby increasing a cost of the IC device. From this point of view, a detection method without a use of the filter is preferable.

In this embodiment, the amplitude is detected by the sampling circuit 24. When the sampling circuit detects the amplitude, since a sampling period needs to coincide with the period of an electric field induced in a living body, an adjusting signal 13 producing a sampling signal has to receive a signal from an oscillator 5.

Figure 20:
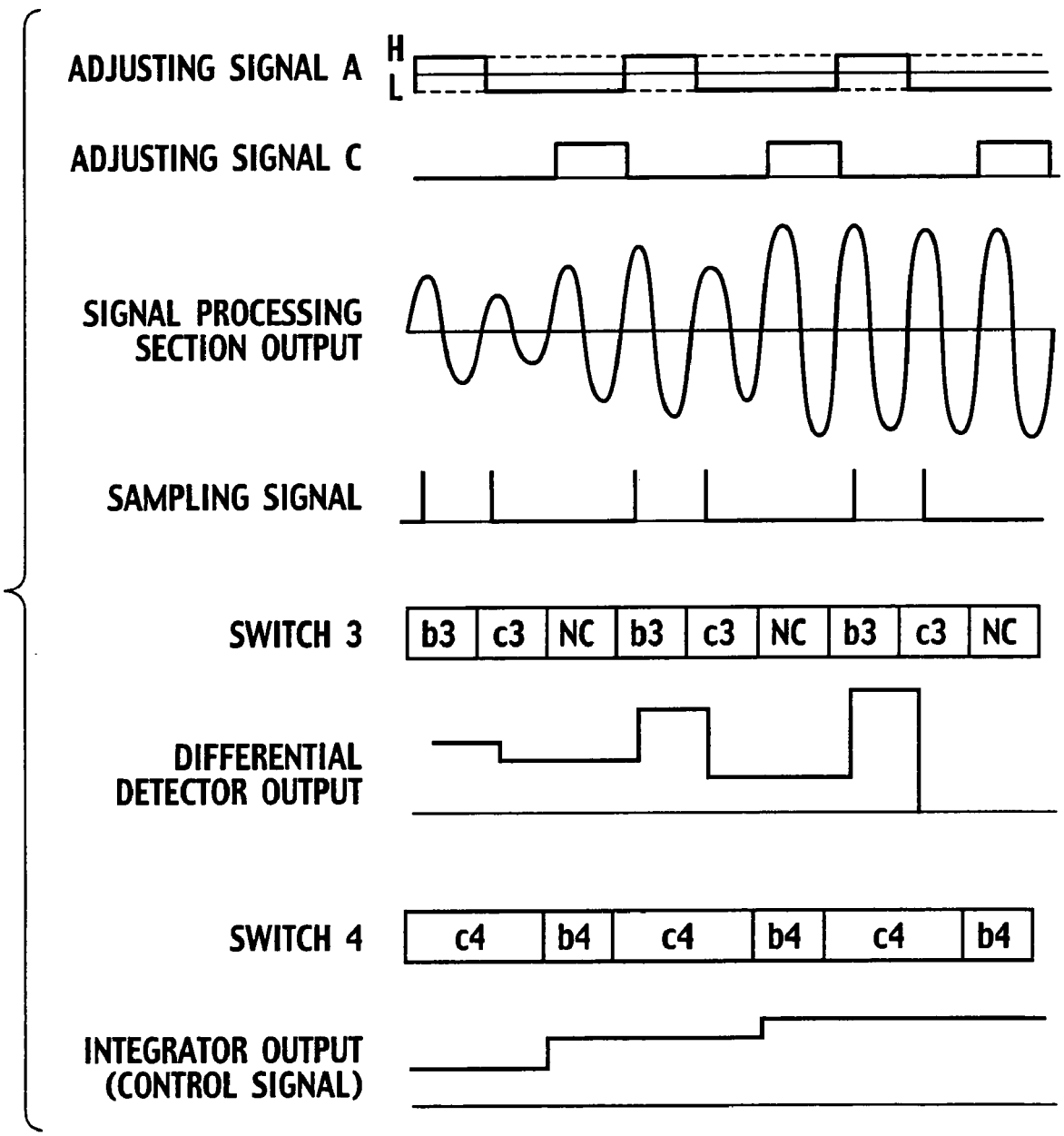
FIG. 20 is an explanatory drawing of an operation of the transceiver according to the sixth embodiment of the present invention.

FIG. 20 illustrates a waveform outputted from each component at the time of reactance adjustment in the transceiver of this embodiment. Into the sampling circuit 24 is inputted a sampling signal in synchronization with the peak of a sine wave. The capacitor C1 stores a signal obtained by sampling the output of a signal processing section 16 when a reactance is large, while the capacitor C2 stores the signal when a reactance is small. A difference between the stored charges by the capacitors C1 and C2 is determined by a differential detector 22 and inputted to a control section 21. The control section 21 then outputs a control signal based on the output signal from the differential detector 22. With this configuration, the amplitude is detected without using a filter.

A Seventh Embodiment

Figure 21:
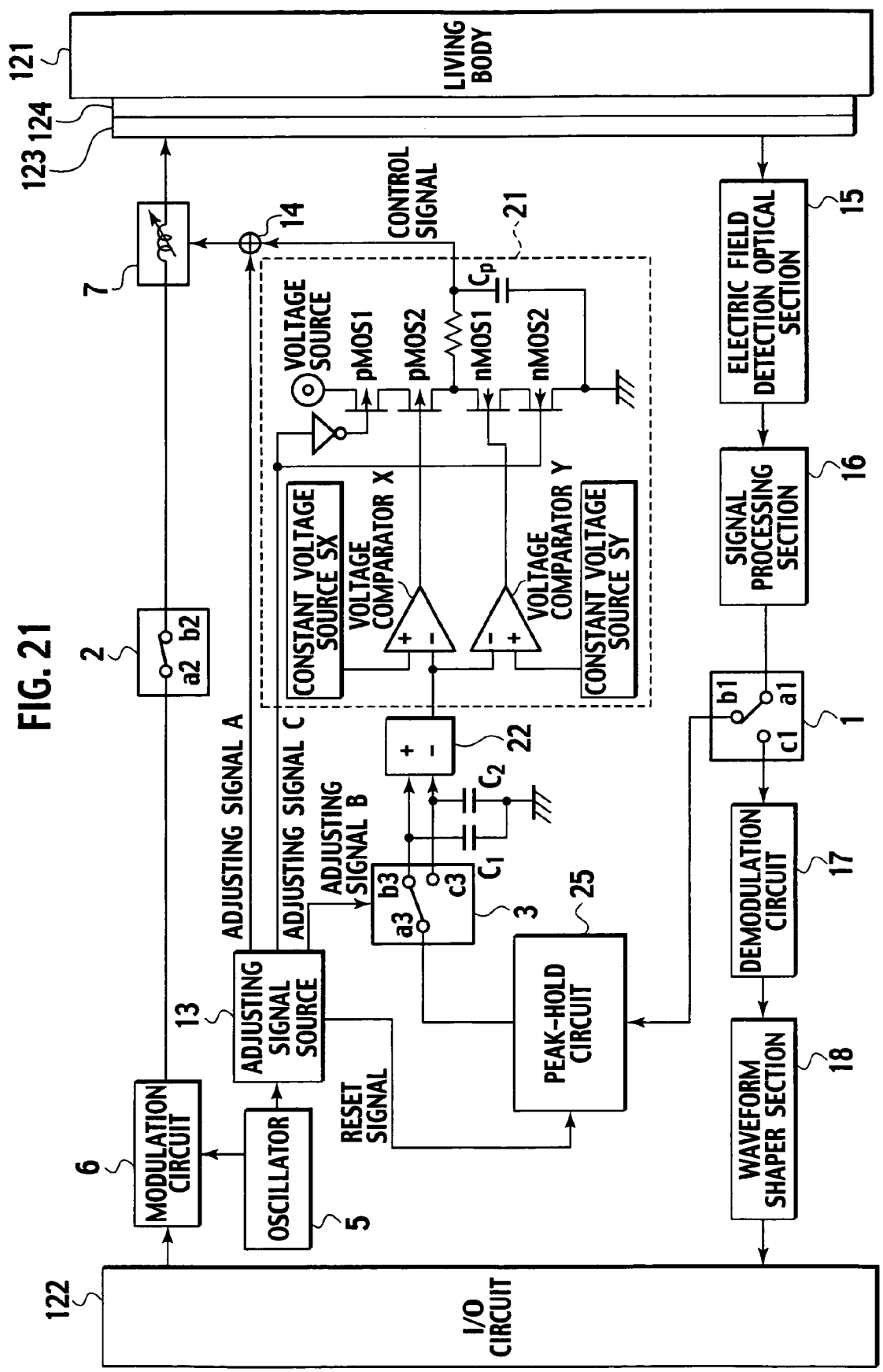
FIG. 21 is an overall schematic diagram of a transceiver according to a seventh embodiment of the present invention.
Figure 22:
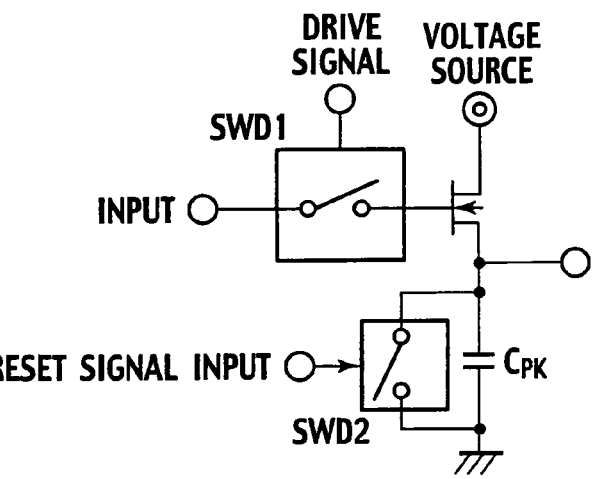
FIG. 22 is an explanatory drawing of an operation of the transceiver according to the seventh embodiment of the present invention.

FIG. 21 is a block diagram of a transceiver according to a seventh invention of the present invention. The transceiver according to the seventh embodiment uses a peak-hold circuit 25 in order to detect the amplitude of an electric signal detected by an electric field detection optical section 15 via a receiving-and-transmitting electrode 123. Namely, while the sampling circuit 24 is used to detect the amplitude in the transceiver according to the sixth embodiment described above, it is the peak-hold circuit 25 that is used instead in the seventh embodiment. Whereas the sampling circuit 24 requires that the sampling signal has to be in synchronization with the wave peak, the peak-hold circuit 25 does not require such synchronization since the circuit 25 maintains a peak of the signal inputted in a certain period of time when the period is set appropriately long. Therefore, compared with a use of the sampling circuit 24, the peak-hold circuit 25 affords a larger phase difference between a carrier and a signal that drives the peak-hold circuit 25. FIG. 22 illustrates a configuration example of the peak-hold circuit 25. The peak-hold circuit 25 illustrated in FIG. 22 is comprised of a switch SWD1 that turns on in order to input a signal when a detector driving signal is at a high level, a capacitor Cpk for holing a peak of an input signal, and a switch SWD2 for resetting a reset signal held by the capacitor Cpk.

Figure 23:
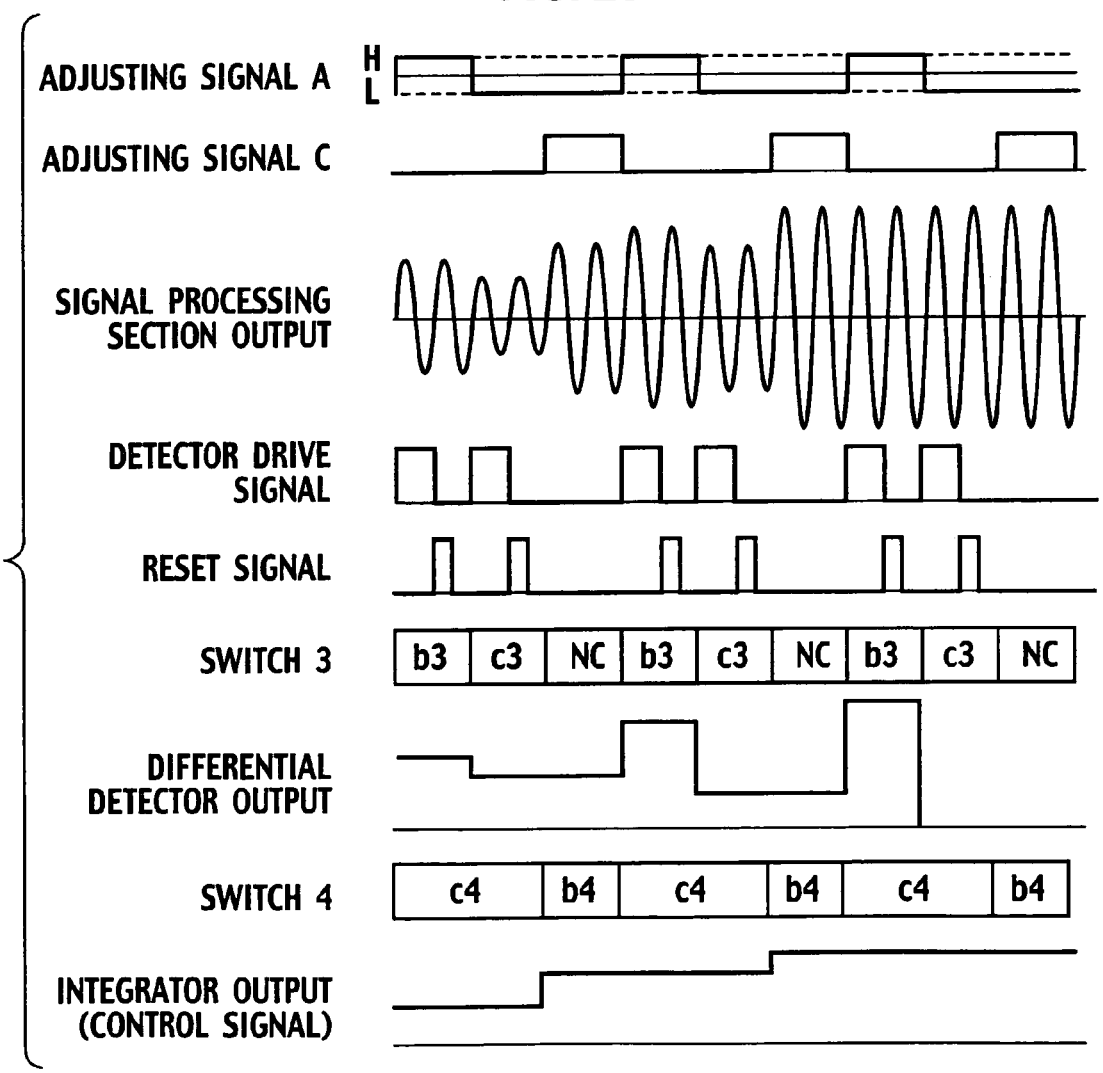
FIG. 23 is an explanatory drawing of an operation of the transceiver according to the seventh embodiment of the present invention.

FIG. 23 illustrates a waveform of a signal outputted from each component. In the peak-hold circuit 25, when the drive signal for a differential detector 22 is at a high level and the reset signal is at a low level, the peak value of the input waveform is stored in the capacitor Cpk. When the reset signal is at a low level, the electric charge stored in the capacitor Cpk is discharged, thereby returning to the initial state. This is performed at the time of the reactance being both high and low, thereby storing electric signals representative of the amplitude in the capacitors C1 and C2. The difference between the stored electric signals are obtained by the differential detector 22 and integrated in the control section 21 to output a control signal. By such an operation, reactance control using the peak-hold circuit 25 is realized.

An Eighth Embodiment

Figure 24:
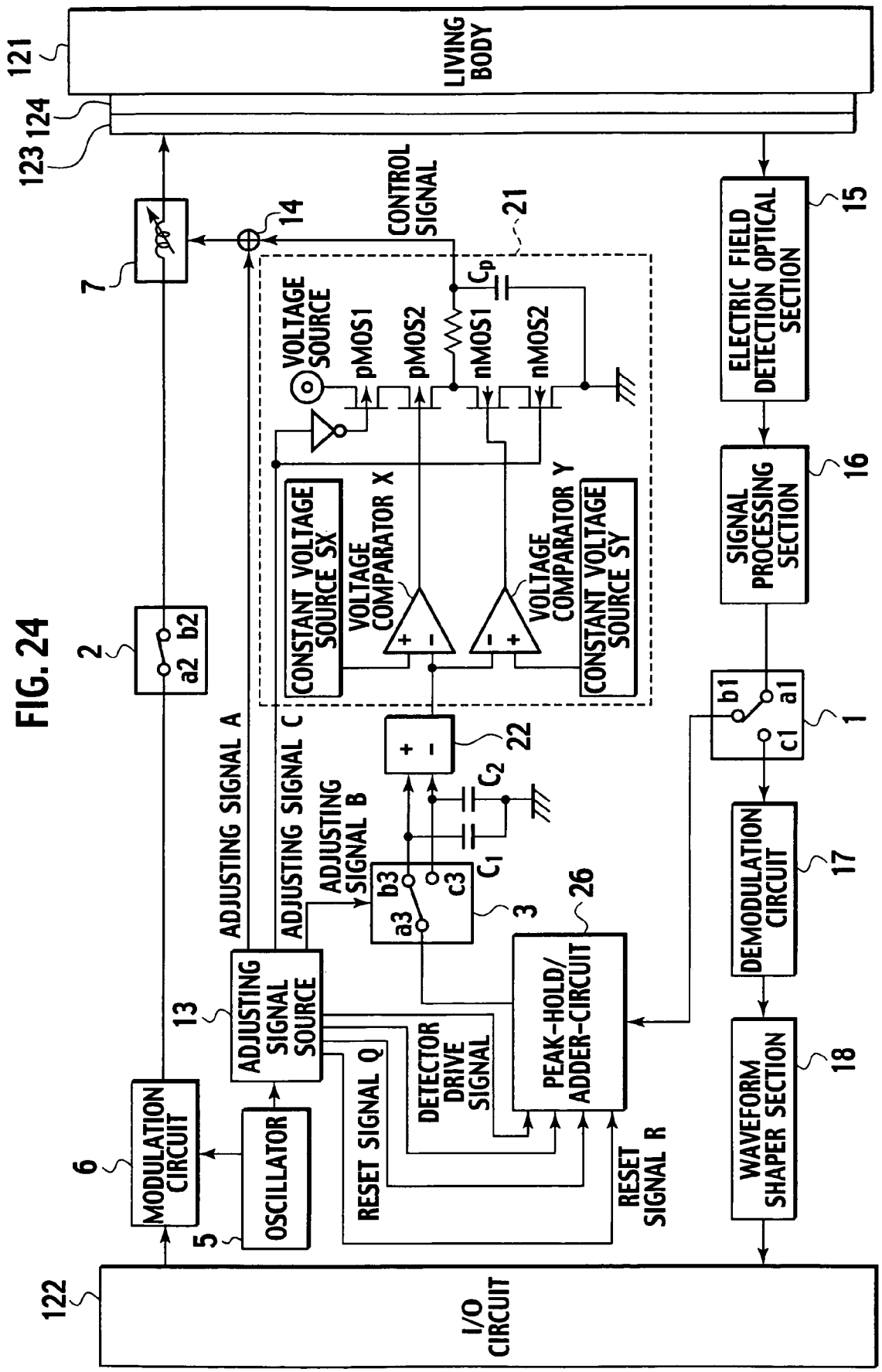
FIG. 24 is an overall schematic diagram of a transceiver according to an eighth embodiment of the present invention.

FIG. 24 is a block diagram of an eighth embodiment of the present invention. A transceiver illustrated in FIG. 24 uses a peak-hold/adder-circuit 26 in order to detect an amplitude of an electric signal detected by an electric field detection optical section 15 via a receiving-and-transmitting electrode 123. In addition, FIG. 25 illustrates a detailed configuration of the peak-hold/adder-circuit 26, in which there are shown a switch SWD4 that connects a contact a5 and a contact b5 when adding or otherwise connects the contact a5 and a contact c5 in order to maintain the signal, and a switch SWD3 that turns on when resetting the output of an integrator.

Figure 25:
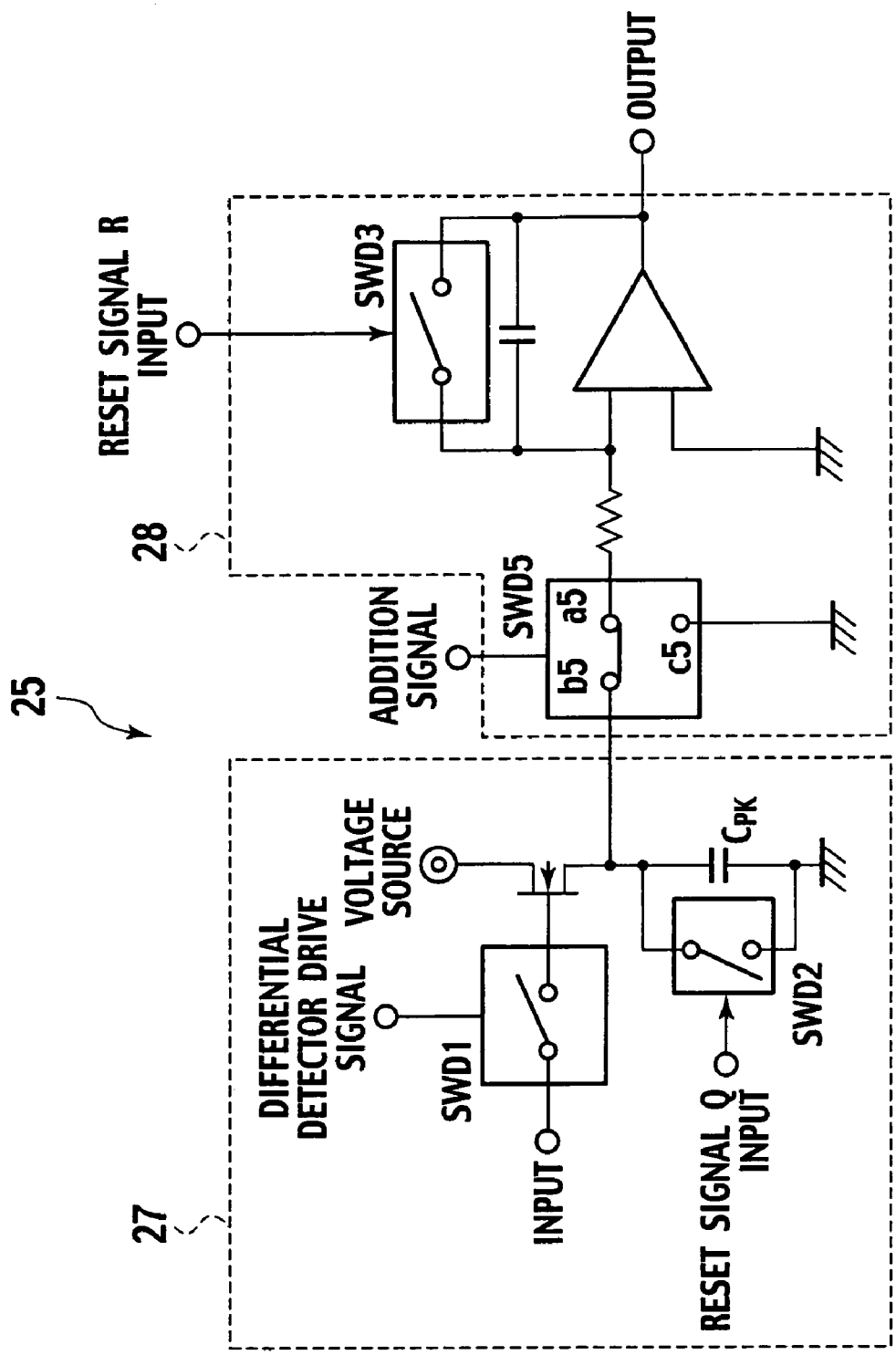
FIG. 25 is a partial schematic diagram of the transceiver according to the eighth embodiment of the present invention.

In the transceiver of which configuration is illustrated in FIGS. 24 and 25, after detection by the peak-hold circuit 27 shown in FIG. 25, an integrator 28 performs adding at the next stage. Even when a peak exceeds its original amplitude by a sudden noise, a peak-hold circuit holds the peak. Since this may cause an erroneous operation, the peak is detected several times to be added and then stored in the capacitors C1 and C2 in order to alleviate the effect due to noises in this embodiment.

Figure 26:
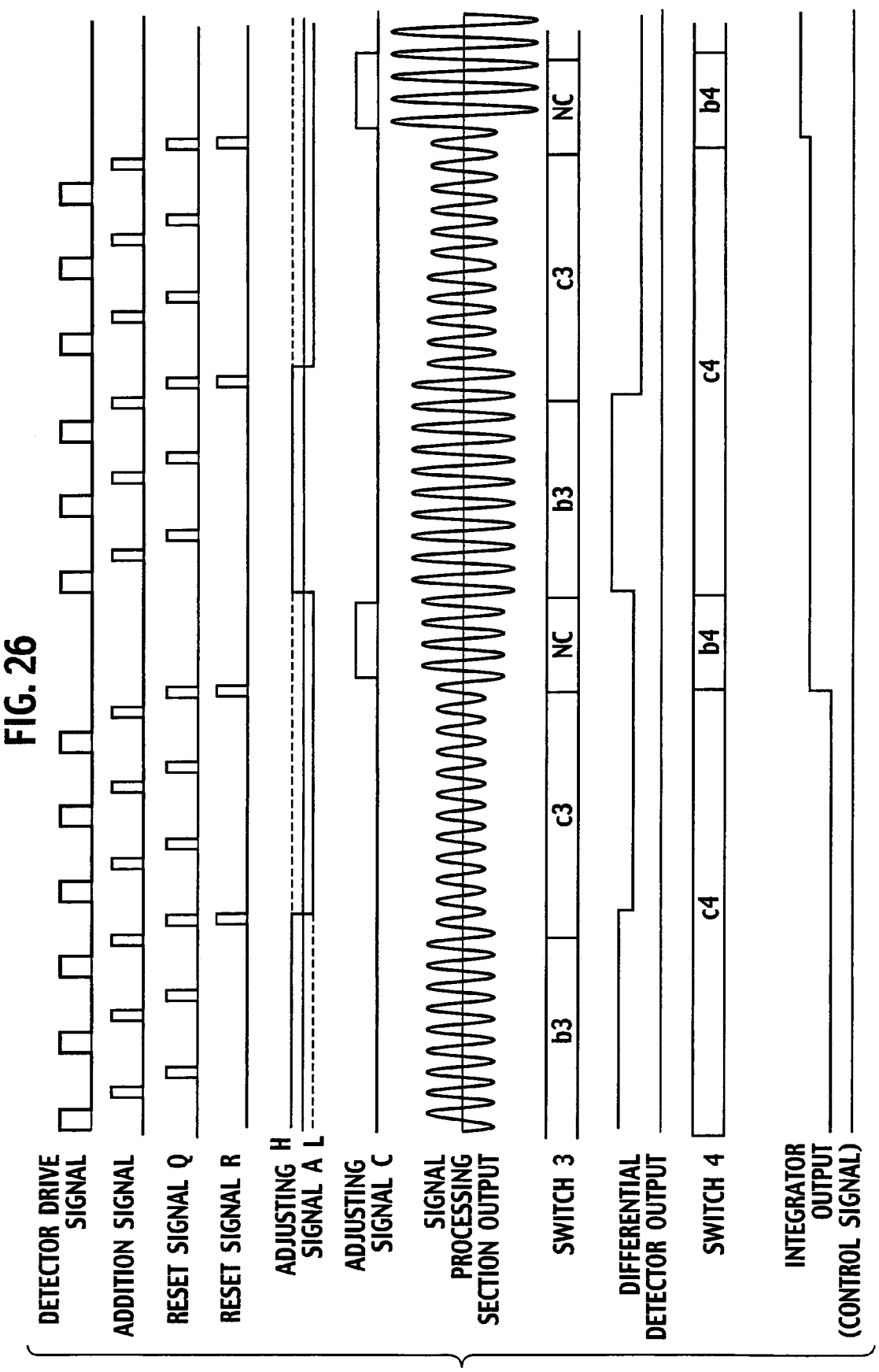
FIG. 26 is an explanatory drawing of an operation of the transceiver according to the eighth embodiment of the present invention.

FIG. 26 illustrates a signal outputted from each component during reactance adjustment. Firstly, reset signals Q and R are at a low level, and the switches SWD2 and SWD3 are off. In addition, a contact a5 and a contact c5 are connected in the switch SWD4. When the detection drive signal is at a high level, a signal is inputted into the peak-hold circuit 27, thereby holding the peak of the input waveform. Then, the input signal (addition signal) to the switch SWD4 turns to be at a high level; the signal maintained at the peak-hold circuit 27 is inputted to the integrator 28 and added; and the stored signal becomes zero by turning on the switch SWD 2. After this procedure is repeated several times, the capacitor C1 stores the added signal representative of the amplitude when the reactance value is large. Next, after the reactance is turned to be lower, the same procedure is performed to store the added signal at the capacitor C2. Next, a signal obtained by taking the difference using the differential detector 22 is inputted to a control section and the control signal is outputted to the variable reactance section 7. Such a procedure alleviates the effect caused by noise when performing reactance adjustment.

A Ninth Embodiment

Figure 27:
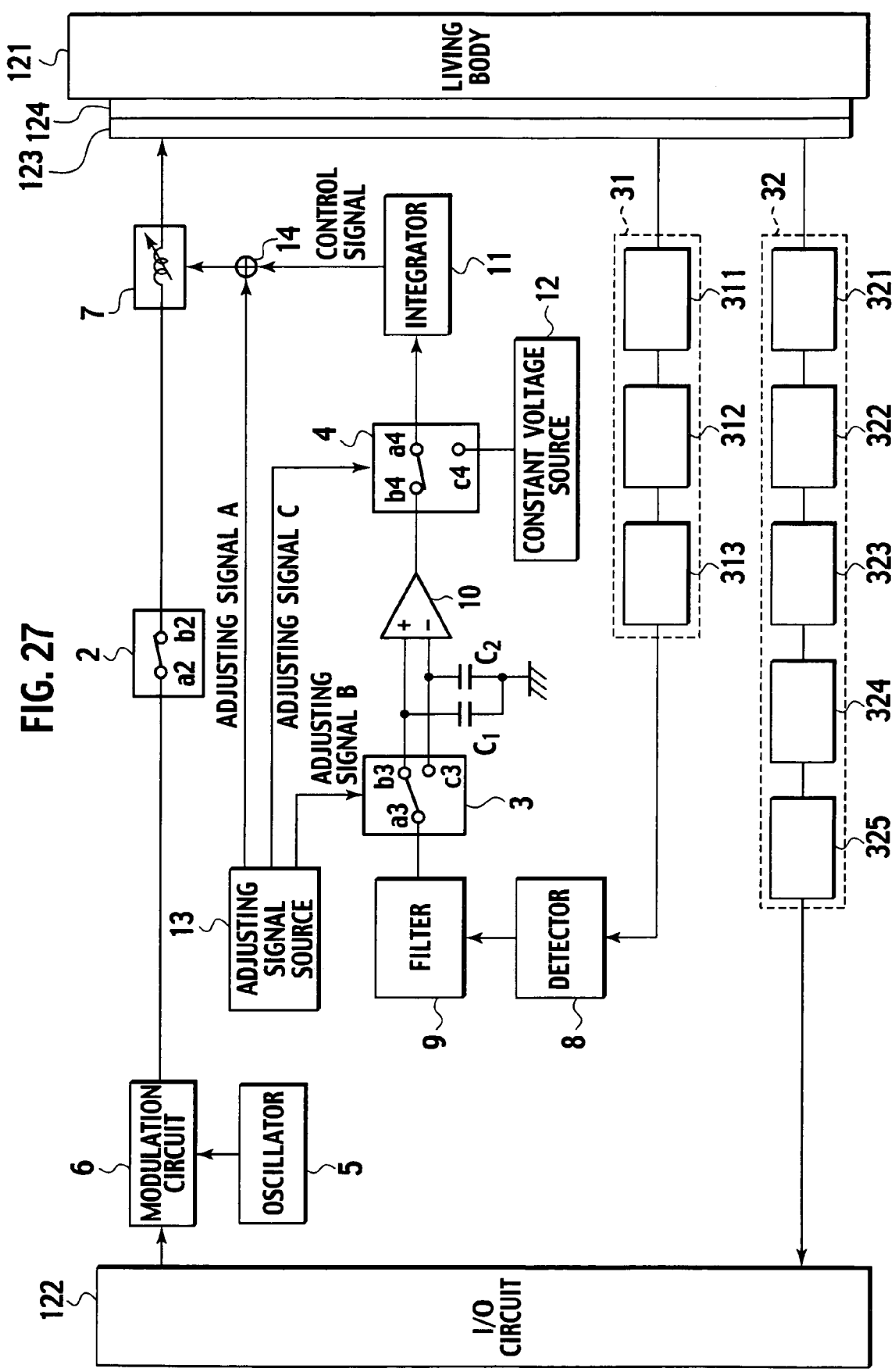
FIG. 27 is an overall schematic diagram of a transceiver according to a ninth embodiment.

Referring to FIG. 27, a transceiver according to a ninth embodiment of the present invention will be described. In each embodiment described above, an electric field induced in the living body is converted into an electric signal exclusively by the electric field detection optical section. The electric signal is supplied either to a signal output section when adjusting reactance or to an I/O circuit via a demodulator section when receiving the signal to be transmitted by switching. On the other hand, the transceiver according to this embodiment uses dedicated receiving sections each for adjusting reactance and for receiving and transmitting. The transceiver according to this embodiment has substantially the same configuration except for the difference in the receiving section and operates in the same manner as the transceiver according to the first embodiment.

Specifically, the transceiver according to this embodiment is provided with a pre-stage processing section 31 between a transmitting-and-receiving electrode 123 and a detector 8 and also a receiving section 32 between the transmitting-and-receiving electrode 123 and an I/O circuit 122 as shown in FIG. 27. The transceiver is not provided with a switch corresponding to the switch 1 illustrated for example in FIG. 5. Therefore, a signal to be served for reactance adjustment is supplied to a signal generation section via the pre-stage processing section 31 and a signal to be received is supplied to a computer via the receiving section 32.

More specifically, the pre-stage processing section 31 includes a filter 311 having a high input impedance, an electric field detection section 312 converting an electric field into an electric signal, a signal processing section 313 having a filter to eliminate noises from the electric signal. Since the filter 311 is provided at a pre-stage of the electric field detection section 312, an adverse effect exercised upon resonance is mitigated; noises are eliminated; and a signal processing is facilitated in the post-posed detector 8.

In addition, the receiving section 32 includes an electric field detection section 321 converting an electric field in the living body into an electric signal, a signal processing section 322 having a filter for eliminating noises, an amplifier 323 amplifying the signal from which noises are eliminated, a demodulation circuit 324 demodulating a signal to be received in the electric signal concerned, and a waveform shaper 325 shaping a waveform of a modulated signal. With this, a signal to be received that has been included in the electric field in the living body 121 is supplied to a computer via the an I/O circuit 122.

As stated above, the transceiver according to the ninth embodiment is provided with distinct receiving sections each for adjusting reactance and for receiving/transmitting. Since the pre-stage receiving section that is exclusively used for adjusting reactance is provided with the high input impedance filter, reactance adjustment is assuredly and stably performed.

By the way, if the receiving section 32 is not provided in the ninth embodiment, the transceiver concerned can be used as a transmitter that performs transmission only.

A Tenth Embodiment

Figure 28:
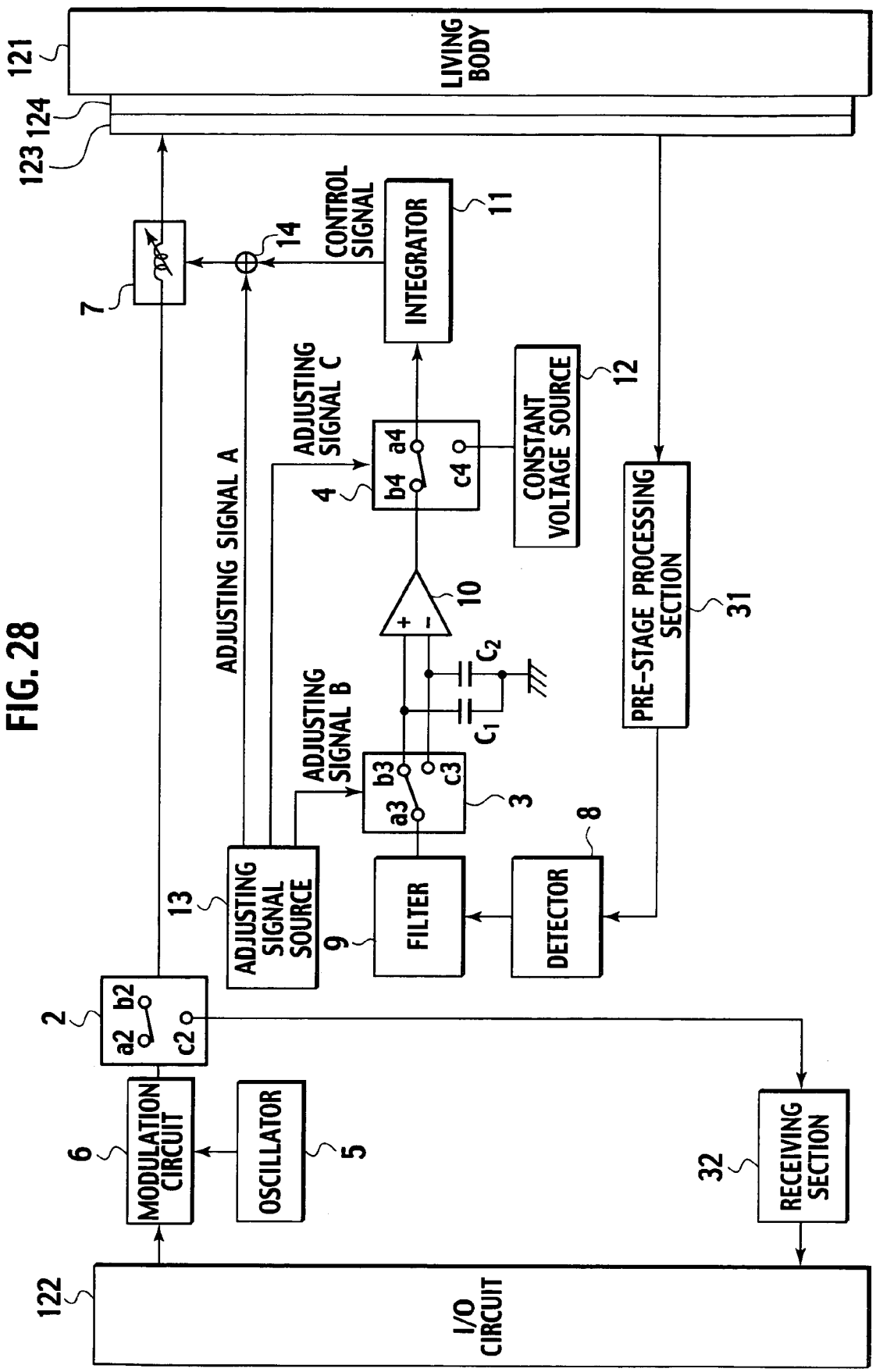
FIG. 28 is an overall schematic diagram of a transceiver according to a tenth embodiment.

Next, referring to FIG. 28, a transceiver according to a tenth embodiment will be described. As shown in FIG. 28, this transceiver is different from the transceiver according to the ninth embodiment in that a receiving section 32 is provided between a switch 2 and an I/O circuit 122. Except for this, the transceiver according to the tenth embodiment shares the same components as the transceiver according to the ninth embodiment.

In the transceiver according to this embodiment, a switch 2 has contacts a1, b1 and c1. When reactance is adjusted or a signal is transmitted, the contacts a1 and b1 are connected. Therefore, a signal suitably used for reactance adjustment or a signal including information to be transmitted is supplied to a transmitting-and-receiving electrode 123 from an oscillator 5 and a modulation circuit via a variable reactance section 7. During reception, the contacts b1 and c1 of the switch 2 are connected and the electric field in the living body is received by the receiving section 32 via the switch 2. By the way, during reception, a control signal is inputted to the variable reactance section 7 so as to reduce the reactance value of the variable reactance section 7.

According to the above configuration, when adjusting reactance or transmitting, since the receiving section 32 is separated from the other circuit elements, an influence exercised on the reactance adjusting operation by the receiving section, specifically, the input stage of the receiving section, is mitigated. Generally, when adjusting reactance, a high voltage is generated due to resonance. When the high voltage has a higher voltage value than a withstand voltage, the electric circuit concerned may be damaged. However, according to the above configuration, since the receiving section 32 is separated when adjusting reactance and such a high voltage is not applied to the receiving section. Thus, the electric circuit of the receiving section is prevented from being damaged. Therefore, the transceiver according to this embodiment is advantageous in that a reliability is improved.

By the way, there can be provided a mechanically operable switch between the receiving section 32 and the transmitting-and-receiving electrode 123 instead of the switch 2, wherein the mechanically operable switch is off when adjusting reactance and is on when transmitting. This can eliminate a possibility of damaging the electric circuit of the electric circuit.

By the way, as such a switch, a switch fabricated by micro machine technique, for example, is preferable.

Referring to several embodiments and modifications, a reactance adjusting apparatus, a transmitter and a communication apparatus using the same, and a signal processing circuit according to the present invention have been described as above. However, the present invention is not limited to the above embodiments and modifications and thus various alterations are possible.

For example, the signal processing circuit according to modifications of the first embodiment is applicable to electric appliances other than the reactance adjusting apparatus.

Figure 29:
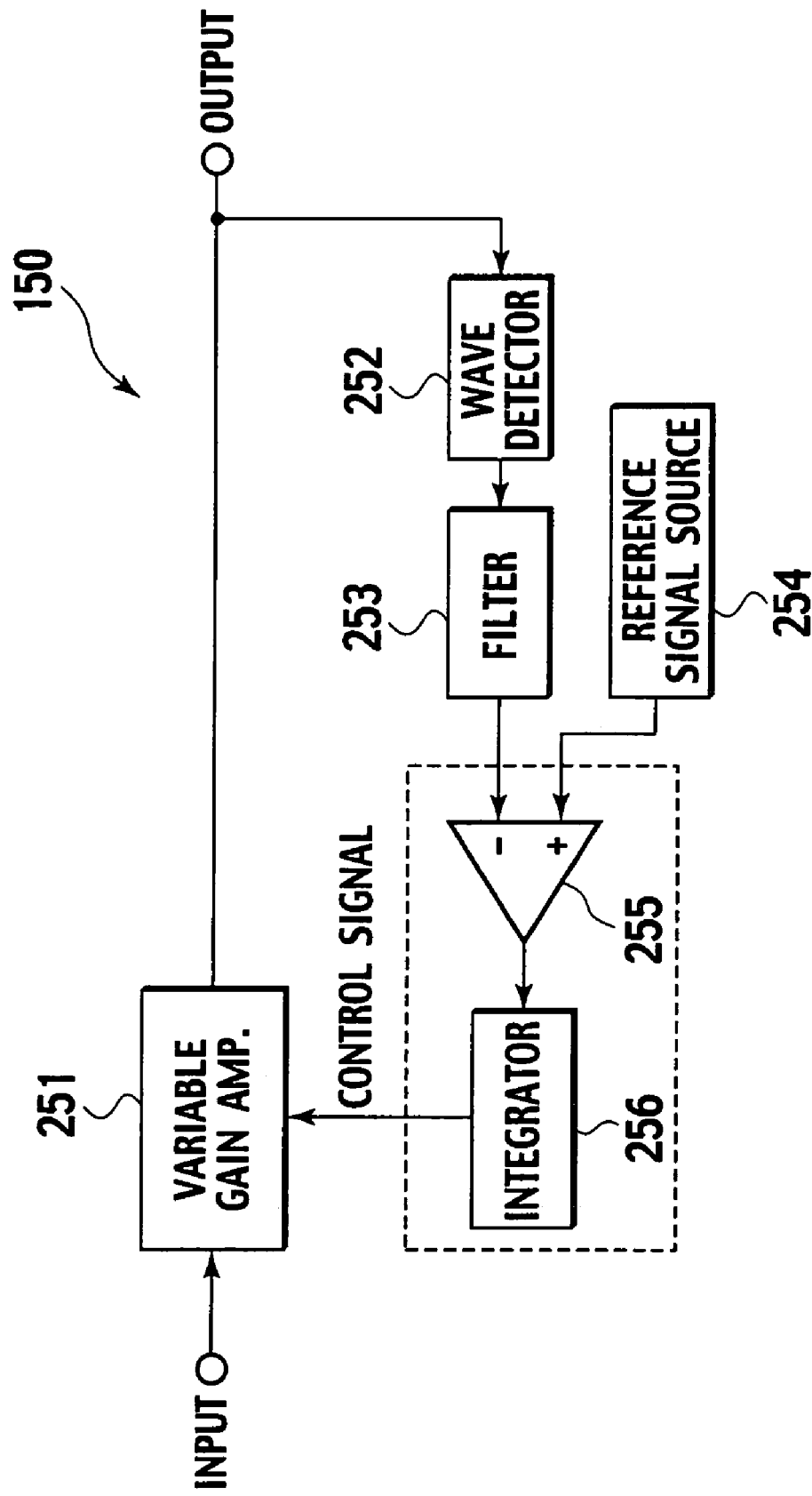
FIG. 29 is a block diagram illustrating an amplifier circuit to which the signal processing circuits can be applied.

FIG. 29 is a block diagram illustrating an outlined configuration of an amplifier circuit to which any one of the signal processing circuits 100, 200, and 203 described in the above embodiment is applicable. An amplifier circuit 150 illustrated in FIG. 29 has a function of automatically adjusting a gain of the amplifier by a negative feedback circuit and any of the above mentioned signal processing circuits is used as a control signal generation means.

A configuration of the amplifier circuit 150 will be described. The amplifier circuit 150 is comprised of a variable gain amplifier 251 that is able to change a gain thereof so as to keep constant an amplitude of an alternating signal outputted even when an amplitude of an inputted alternating signal is changed, a detector 252 that inputs and detects the signal outputted from the variable gain amplifier 251, a filter 253 smoothing the signal outputted from the detector 252, a reference signal source 254 outputting a reference signal to be a target amplitude of the signal outputted from the variable gain amplifier 251, a comparator 255 comparing the signal outputted from the filter 253, the signal corresponding to the amplitude of the signal from the variable gain amplifier 251, and the signal outputted from the reference signal source 254 to determine the difference between the two signals, and an integrator 256 outputting a control signal based on the integration result. Nothing to say that any one of the signal processing circuits 100, 200, and 203 is applicable as the integrator 256.

In the amplifier circuit 150 having the above configuration, when the signal outputted from the filter 253 is higher than the reference signal, the signal outputted from the integrator 256, i.e., the control signal controlling the gain of the variable gain amplifier 251 becomes large. As a result, the gain of the variable gain amplifier 251 becomes large accordingly. On the other hand, when the signal outputted from the filter 253 is lower than the reference signal, the signal (control signal) outputted from the integrator 256 becomes small, thereby reducing the gain of the variable gain amplifier 251. Such a signal processing continues until the signal outputted from the filter 253, which corresponds to the amplitude of the signal outputted from the variable gain amplifier 251, becomes equal to the reference signal (a target value). The amplitude of the signal outputted from the variable gain amplifier 251 is kept constant even when the amplitude of the alternating signal to be inputted to the variable gain amplifier 251 is varied.

In the amplifier circuit 150 having such a function, even a coincidence of an observed value with the target value does not lead to an unstable state. Therefore, no large current flows from a voltage source Vdd to the earth ground, thereby preventing an energy consumption from increasing.

By the way, each of the above-stated signal processing circuits 100, 200, and 203 is only an embodiment of the signal processing circuit according to the present invention and the signal processing circuit applicable as the integrator 256 is not limited to the embodiments. Namely, the present invention includes various embodiments that exert substantially the same operation and effect as the signal processing circuits 100, 200 and 203, without departing from the scope and spirit of the claims. A use of such embodiments makes it possible to configure the amplifier circuit 150 according to the above example.

INDUSTRIAL APPLICABILITY

A reactance adjuster, a transceiver, a transmitting apparatus, and a signal processing circuit preferable for these are preferably applicable for example to a wearable computer system mountable to a human body.

The invention claimed is:

1. A reactance adjuster for adjusting reactance caused by a communication apparatus that transmits and/or receives a signal via an electric field transmittable medium, said reactance adjuster comprising:

a signal generation section generating a probe signal, an electrode inducing an electric field based on said probe signal in said electric field transmittable medium, a resonance section that is connected between said signal generation section and said electrode and induces a series resonance by adjusting reactance against parasitic capacitance induced between said electric field transmittable medium, said communication apparatus, and an earth ground, an adjusting signal generation section outputting alternatingly a high level signal and a low level signal to said resonator section, an electric field detection section that receives an electric field in said electric field transmittable medium and generates an electric signal based on the received electric field, a signal output section including a first electric charge storing means storing an electric charge in accordance with said electric signal while said adjusting signal generation section outputs a high level signal to said resonator section, a second electric charge storing means storing an electric charge in accordance with said electric signal while said adjusting signal generation section outputs a low level signal to said resonator section, and a voltage comparator comparing a voltage across said first electric charge storing means and a voltage across said second electric charge storing means to output a predetermined signal in accordance with the comparison result, and a control section that outputs a voltage having a constant voltage value to said resonator section while either one of said first and said second electric charge storing means is storing an electric charge, and inputs said predetermined signal to output a voltage based on the inputted predetermined signal to said resonator section while said first and second electric charge storing means stop storing an electric charge, wherein said control section comprises:

a constant voltage source outputting the voltage having a predetermined voltage value, an integrator outputting a voltage having said constant voltage value when receiving the voltage having said predetermined voltage value and outputting a voltage based on said predetermined signal when receiving said predetermined voltage to said resonator section, an output switching section inputting selectively the voltage having said predetermined voltage value or said predetermined signal, thus outputting said voltage having said predetermined voltage value to said integrator while either one of said first and said second electric charge storing means is storing an electric charge and outputting said predetermined signal to said integrator when said first and second electric charge storing means stop storing an electric charge, and wherein said integrator comprises:

a first connection means, one end of which is connected to a positive electrode of a voltage source outputting a predetermined voltage, a second connection means, one end of which is connected to the other end of said first connection means and the other end of which is connected to a negative electrode of said voltage source, a first comparison means comparing a predetermined first threshold voltage and said predetermined signal to output a signal for turning on said first connection means when said predetermined signal is lower than said first threshold voltage, a second comparison means comparing a second threshold voltage higher than said first threshold voltage and said predetermined signal to output a signal for turning on said connection means when said predetermined signal is higher than said second threshold voltage, and a capacitor, one end of which is connected to said other end of said first connection means and the other end of which is connected to said negative electrode.

2. A reactance adjuster as recited in claim 1, wherein said integrator further comprises:

a first current source provided between said positive electrode and said first connection means, a third comparison means that compares said predetermined signal and a third threshold voltage lower than said first threshold voltage and outputs a current control signal to said first current source so that a first constant current having a predetermined current value flows from said first current source when said predetermined signal is lower than said threshold voltage or a second constant current smaller than said first constant current flows from said first current source when said predetermined signal is higher than said third threshold voltage and lower than said first threshold voltage, a second current source provided between said negative electrode and said second connection means, and a fourth comparison means that compares said predetermined signal and said fourth threshold voltage higher than said second threshold voltage and outputs a current control signal to said second current source so that a third constant current flows from said second current source when said predetermined signal is higher than said fourth threshold voltage or a fourth current smaller than said third current flows from said second current source when said predetermined signal is higher than said second threshold voltage and lower than said fourth threshold voltage.

3. A reactance adjuster as recited in claim 1, wherein said integrator further comprises:

a first variable current source provided between said positive electrode and said first connection means, a first differential amplifying means that compares said predetermined signal and said first threshold voltage and outputs a cua ent control signal to said first variable current source so that the smaller said determined signal is, the larger the current flows from said variable current source, a second variable current source provided between said negative electrode and said second connection means, and a second differential amplifying means that compares said predetermined signal and said second threshold voltage and outputs a current control signal to said second variable current source so that the higher said predetermined signal is, the larger the current flows from said second variable current source.

4. A reactance adjuster as recited in claim 1, wherein said integrator further comprises:

a first variable resistor provided between said positive electrode and said first connection means, a first differential amplifying means that compares said predetermined signal and said first threshold voltage and outputs a resistance value control signal to said first variable resistor so that the lower said predetermined signal is, the lower the resistance of said first variable resistor becomes, a second variable resistor provided between said negative electrode and said second connection means, and a second differential amplifying means that compares said predetermined signal and said second threshold voltage and outputs a resistance value control signal to said second variable resistor so that the higher said predetermined signal is, the lower the resistance of said second variable resistor becomes.

5. A reactance adjuster for adjusting reactance caused by a communication apparatus that transmits and/or receives a signal via an electric field transmittable medium, said reactance adjustor comprising:

a signal generation section generating a probe signal, an electrode inducing an electric field based on said probe signal in said electric field transmittable medium, a resonance section that is connected between said signal generation section and said electrode and induces a series resonance by adjusting reactance against parasitic capacitance induced between said electric field transmittable medium, said communication apparatus, and an earth ground, an adjusting signal generation section outputting alternatingly a high level signal and a low level signal to said resonator section, an electric field detection section that receives an electric field in said electric field transmittable medium and generates an electric signal based on the received electric field, a signal output section including a first electric charge storing means storing an electric charge in accordance with said electric signal while said adjusting signal generation section outputs a high level signal to said resonator section, a second electric charge storing means storing an electric charge in accordance with said electric signal while said adjusting signal generation section outputs a low level signal to said resonator section, and a voltage comparator comparing a voltage across said first electric charge storing means and a voltage across said second electric charge storing means to output a predetermined signal in accordance with the comparison result, and a control section that outputs a voltage having a constant voltage value to said resonator section while either one of said first and said second electric charge storing means is storing an electric charge, and inputs said predetermined signal to output a voltage based on the inputted predetermined signal to said resonator section while said first and second electric charge storing means stop storing an electric charge, wherein said control section comprises:
- a first p-channel Metal Oxide Semiconductor Field Effect Transistor (MOS-FET) that turns off while either one of said first and said second electric charge storing means is storing an electric charge and turns on when said first and said second electric charge storing means stop storing,
- a second p-channel MOS-FET connected in series with said first p-channel MOS-FET, said second p-channel MOS-FET turning on when said voltage comparator determines that a voltage across said first electric charge storing means is higher than a voltage across said second electric charge storing means and turning off when said voltage comparator determines that a voltage across said first electric charge storing means is lower than a voltage across said second electric charge storing means,
- a first n-channel MOS-FET connected in series with said second p-channel MOS-FET, said first n-channel MOS-FET turning on when said voltage comparator determines that a voltage across said first electric charge storing means is lower than a voltage across said second electric charge storing means and turning off when said voltage comparator determines that a voltage across said first electric charge storing means is higher than a voltage across said second electric charge storing means,
- a second n-channel MOS-FET connected in series with said first n-channel MOS-FET, said second n-channel MOS-FET turning off when either one of said first and said second electric charge storing means is storing an electric charge and turning on when said first and said second electric charge storing means stop storing, and
- a capacitor, one end of which is connected to a node between said second p-channel MOS-FET and said first n-channel MOS-FET and the other end of which is connected to the earth ground.

6. A reactance adjuster as recited in claim 5, wherein said control section further comprises:
- a first reference voltage source outputs a predetermined first reference voltage,
- a first voltage comparator comparing said predetermined signal and said first reference voltage to output a voltage in accordance with the comparison result to said second p-channel MOS-FET,
- a second reference voltage source outputting a predetermined second reference voltage, and
- a second voltage comparator comparing said predetermined signal and said second reference voltage to output a voltage in accordance with the comparison result to said first n-channel MOS-FET.

7. A reactance adjuster as recited in claim 6, wherein said control section further comprises:
- a first variable current source connected between said first p-channel MOS-FET and said second p-channel MOS-FET,
- a first differential amplifying means comparing said predetermined signal and said first reference voltage to output a current control signal to said first variable current source so that the smaller said predetermined signal is, the larger the current flows from said first variable current source,
- a second variable current source connected between said first n-channel MOS-FET and said second n-channel MOS-FET, and
- a second differential amplifying means comparing said predetermined signal and said second reference voltage to output a current control signal to said second variable current source so that the larger said predetermined signal is, the larger the current flows from said second variable current source.

8. A reactance adjuster as recited in claim 6, wherein said control section further comprises:
- a first variable resistor connected between said first p-channel MOS-FET and said second p-channel MOS-FET,
- a third comparator comparing said first reference voltage and said predetermined signal to output a signal in accordance with the comparison result so as to control resistance of said first variable resistor,
- a second variable resistor connected between said first n-channel MOS-FET and said second n-channel MOS-FET, and
- a fourth comparator comparing said second reference voltage and said predetermined signal to output a signal in accordance with the comparison result so as to control resistance of said second variable resistor.

9. A reactance adjuster as recited in claim 6, wherein said control section further comprises:
- a first current source connected between said first p-channel MOS-FET and said second p-channel MOS-FET,
- a third signal comparison means that compares said predetermined signal and a third reference voltage lower than said first reference voltage and outputs a current control signal to said first current source so that said first current source flows a first constant current when said predetermined signal is lower than said third reference voltage or said first current source flows a second constant current smaller than said first constant current when said predetermined signal is higher than said third reference voltage and lower than said first reference voltage,
- a second current source connected between said first n-channel MOS-FET and said second n-channel MOS-FET, and
- a fourth signal comparator that compares said predetermined signal and a fourth reference voltage higher than said second reference voltage and outputs a current control signal to said second current source so that said second current source flows a third constant current when said predetermined signal is higher than said fourth reference voltage or said second current source flows a fourth constant current smaller than said third constant current when said predetermined signal is higher than said second reference voltage and lower than said fourth reference voltage.

10. A reactance adjuster as recited in either claim 2 or 9, wherein said first constant current and said third constant current have a same current value, and wherein said second constant current and said fourth constant current have a same current value.

11. A reactance adjuster for adjusting reactance caused by a communication apparatus that transmits and/or receives a signal via an electric field transmittable medium, said reactance adjuster comprising:
- a signal generation section generating a probe signal,
- an electrode inducing an electric field based on said probe signal in said electric field transmittable medium,
- a resonance section that is connected between said signal generation section and said electrode and induces a series resonance by adjusting reactance against parasitic capacitance induced between said electric field transmittable medium, said communication apparatus, and an earth ground,
- an adjusting signal generation section outputting alternatingly a high level signal and a low level signal to said resonator section, an electric field detection section that receives an electric field in said electric field transmittable medium and generates an electric signal based on the received electric field, a signal output section including a first electric charge storing means storing an electric charge in accordance with said electric signal while said adjusting signal generation section outputs a high level signal to said resonator section, a second electric charge storing means storing an electric charge in accordance with said electric signal while said adjusting signal generation section outputs a low level signal to said resonator section, and a voltage comparator comparing a voltage across said first electric charge storing means and a voltage across said second electric charge storing means to output a predetermined signal in accordance with the comparison result, and a control section that outputs a voltage having a constant voltage value to said resonator section while either one of said first and said second electric charge storing means is storing an electric charge, and inputs said predetermined signal to output a voltage based on the inputted predetermined signal to said resonator section while said first and second electric charge storing means stop storing an electric charge, wherein said signal output section further comprises a sampling means sampling said electric signal to output a voltage in accordance with said electric signal.

12. A reactance adjuster for adjusting reactance caused by a communication apparatus that transmits and/or receives a signal via an electric field transmittable medium, said reactance adjuster comprising:

a signal generation section generating a probe signal, an electrode inducing an electric field based on said probe signal in said electric field transmittable medium, a resonance section that is connected between said signal generation section and said electrode and induces a series resonance by adjusting reactance against parasitic capacitance induced between said electric field transmittable medium, said communication apparatus, and an earth ground, an adjusting signal generation section outputting alternatingly a high level signal and a low level signal to said resonator section, an electric field detection section that receives an electric field in said electric field transmittable medium and generates an electric signal based on the received electric field, a signal output section including a first electric charge storing means storing an electric charge in accordance with said electric signal while said adjusting signal generation section outputs a high level signal to said resonator section, a second electric charge storing means storing an electric charge in accordance with said electric signal while said adjusting signal generation section outputs a low level signal to said resonator section, and a voltage comparator comparing a voltage across said first electric charge storing means and a voltage across said second electric charge storing means to output a predetermined signal in accordance with the comparison result, and a control section that outputs a voltage having a constant voltage value to said resonator section while either one of said first and said second electric charge storing means is storing an electric charge, and inputs said predetermined signal to output a voltage based on the inputted predetermined signal to said resonator section while said first and second electric charge storing means stop storing an electric charge, wherein said signal output section further comprises a peak-hold means holding a peak value of an amplitude of said electric signal to output a voltage in accordance with the peak value.

13. A reactance adjuster as recited in claim 12, wherein said peak-hold means comprises an addition means detecting said peak value at a predetermined number of times to add said peak value.

14. A signal processing circuit comprising:

a first connection means, one end of which is connected to a positive electrode of a voltage source outputting a predetermined voltage, a second connection means, one end of which is connected to the other end of said first connection means and the other end of which is connected to a negative electrode of said voltage source, a first comparison means that compares a predetermined first threshold voltage and an input voltage and outputs a signal to turn on said first connection means when said input voltage is lower than said first threshold voltage, a second comparison means that compares an input voltage and a second threshold voltage higher than said first threshold voltage and outputs a signal to turn on said second connection means when said input voltage is higher than said second threshold voltage, a capacitor, one end of which is connected to said other end of said first connection means and the other end of which is connected to said negative electrodes, a first current source provided between said positive electrode and said first connection means, a third comparison means that compares an input voltage and a third threshold voltage lower than said first threshold voltage and output a current control signal to said first current source so that a first constant current flows from said first current source when said input voltage is lower than said third threshold voltage or a second constant current smaller than said first constant current flows from said first current source when said input voltage is higher than said third threshold voltage and lower than said first threshold voltage, a second current source provided between said negative electrode and said second connection means, and a fourth comparison means that compares an input voltage and a fourth threshold voltage higher than said second threshold voltage and outputs a current control signal to said second current source so that a third constant current flows from said second current source when said input voltage is higher than said fourth threshold voltage or a fourth constant current smaller than said third constant current flows from said second current source when said input voltage is higher than said second threshold voltage and lower than said fourth threshold voltage.

15. A signal processing circuit comprising:

a first connection means, one end of which is connected to a positive electrode of a voltage source outputting a predetermined voltage, a second connection means, one end of which is connected to the other end of said first connection means and the other end of which is connected to a negative electrode of said voltage source, a first comparison means that compares a predetermined first threshold voltage and an input voltage and outputs a signal to turn on said first connection means when said input voltage is lower than said first threshold voltage, a second comparison means that compares an input voltage and a second threshold voltage higher than said first threshold voltage and outputs a signal to turn on said second connection means when said input voltage is higher than said second threshold voltage, a capacitor, one end of which is connected to said other end of said first connection means and the other end of which is connected to said negative electrodes, a first variable current source provided between said positive electrode and said first connection means, a first differential amplifying means that compares an input voltage and said first threshold voltage and outputs a current control signal to said first variable current source so that the lower said input voltage is, the larger the current flows from said first variable current source, a second variable current source provided between said negative electrode and said second connection means, and a second differential amplifying means that compares an input voltage and said second threshold voltage and outputs a current control signal to said second variable current source so that the higher said input voltage is, the larger the current flows from said second variable current source.

16. A signal processing circuit comprising:

a first connection means, one end of which is connected to a positive electrode of a voltage source outputting a predetermined voltage, a second connection means, one end of which is connected to the other end of said first connection means and the other end of which is connected to a negative electrode of said voltage source, a first comparison means that compares a predetermined first threshold voltage and an input voltage and outputs a signal to turn on said first connection means when said input voltage is lower than said first threshold voltage, a second comparison means that compares an input voltage and a second threshold voltage higher than said first threshold voltage and outputs a signal to turn on said second connection means when said input voltage is higher than said second threshold voltage, a capacitor, one end of which is connected to said other end of said first connection means and the other end of which is connected to said negative electrodes, a first variable resistor provided between said positive electrode and said first connection means, a first differential amplifying means that compares an input voltage and said first threshold voltage and outputs a resistance control signal to said first variable resistor so that the lower said input voltage is, the smaller the resistance of said first variable resistor becomes, a second variable resistor provided between said negative electrode and said second connection means, and a second differential amplifying means that compares an input voltage and said second threshold voltage and outputs a resistance control signal to said second variable resistor so that the higher said input voltage is, the lower the resistance of said second variable resistor becomes.

17. A transceiver transmitting and receiving data via an electric field transmittable medium, comprising:

a reactance adjuster for adjusting reactance caused by a communication apparatus that transmits and/or receives a signal via an electric field transmittable medium, said reactance adjuster comprising:

a signal generation section generating a probe signal, an electrode inducing an electric field based on said probe signal in said electric field transmittable medium, a resonance section that is connected between said signal generation section and said electrode and induces a series resonance by adjusting reactance against parasitic capacitance induced between said electric field transmittable medium, said communication apparatus, and an earth ground, an adjusting signal generation section outputting alternatingly a high level signal and a low level signal to said resonator section, an electric field detection section that receives an electric field in said electric field transmittable medium and generates an electric signal based on the received electric field, a signal output section including a first electric charge storing means storing an electric charge in accordance with said electric signal while said adjusting signal generation section outputs a high level signal to said resonator section, a second electric charge storing means storing an electric charge in accordance with said electric signal while said adjusting signal generation section outputs a low level signal to said resonator section, and a voltage comparator comparing a voltage across said first electric charge storing means and a voltage across said second electric charge storing means to output a predetermined signal in accordance with the comparison result, and a control section that outputs a voltage having a constant voltage value to said resonator section while either one of said first and said second electric charge storing means is storing an electric charge, and inputs said predetermined signal to output a voltage based on the inputted predetermined signal to said resonator section while said first and second electric charge storing means stop storing an electric charge, an interface portion for use in communication with a computer managing data to be transmitted, a data signal generation portion provided between said interface portion and said resonance portion, said data signal generation portion generating a signal wave including data to be transmitted obtained via said interface portion to supply the data to said resonance portion, and a receiving portion provided between said interface portion and said electrode, said receiving portion detecting an electric field in said electric field transmittable medium via said electrode and obtaining data to be received from the electric field detected so as to supply the data to said interface portion.

18. A transceiver as recited in claim 17, wherein said receiving portion inputs a converted electric signal from said electric field detection portion and obtains data to be received from the electric signal to supply to said interface portion.

19. A transceiver as recited in claim 17, wherein said data signal generation portion generates said probe signal.

20. A transmitter transmitting data via an electric field transmittable medium, comprising:

a reactance adjuster for adjusting reactance caused by a communication apparatus that transmits and/or receives a signal via an electric field transmittable medium, said reactance adjuster comprising:

a signal generation section generating a probe signal, an electrode inducing an electric field based on said probe signal in said electric field transmittable medium, a resonance section that is connected between said signal generation section and said electrode and induces a series resonance by adjusting reactance against parasitic capacitance induced between said electric field transmittable medium, said communication apparatus, and an earth ground, an adjusting signal generation section outputting alternatingly a high level signal and a low level signal to said resonator section, an electric field detection section that receives an electric field in said electric field transmittable medium and generates an electric signal based on the received electric field, a signal output section including a first electric charge storing means storing an electric charge in accordance with said electric signal while said adjusting signal generation section outputs a high level signal to said resonator section, a second electric charge storing means storing an electric charge in accordance with said electric signal while said adjusting signal generation section outputs a low level signal to said resonator section, and a voltage comparator comparing a voltage across said first electric charge storing means and a voltage across said second electric charge storing means to output a predetermined signal in accordance with the comparison result, and a control section that outputs a voltage having a constant voltage value to said resonator section while either one of said first and said second electric charge storing means is storing an electric charge, and inputs said predetermined signal to output a voltage based on the inputted predetermined signal to said resonator section while said first and second electric charge storing means stop storing an electric charge, an interface portion for use in communication with a computer managing data to be transmitted, and a data signal generation portion provided between said interface portion and said resonance portion, said data signal generation portion generating a signal wave including data to be transmitted obtained via said interface portion to supply the data to said resonance portion.

21. A transmitter as recited in claim 20, wherein said data signal generation portion generates said probing signal.

* * * * *